(12) United States Patent
Roh et al.

(10) Patent No.: US 8,729,551 B2
(45) Date of Patent: May 20, 2014

(54) FLAT PANEL DISPLAY

(75) Inventors: Nam-Seok Roh, Seongnam-si (KR); Jung-Woo Park, Seoul (KR); Dae-Jin Park, Incheon (KR); Yu-Jin Kim, Busan (KR); Joo-Han Bae, Suwon-si (KR); Tae-Hyung Hwang, Seoul (KR); Seok-Joon Hong, Seoul (KR)

(73) Assignee: Samsung Display Co., Ltd. (KR)

( * ) Notice: Subject to any disclaimer, the term of this patent is extended or adjusted under 35 U.S.C. 154(b) by 249 days.

(21) Appl. No.: 13/038,545

(22) Filed: Mar. 2, 2011

(65) Prior Publication Data

US 2011/0227080 A1 Sep. 22, 2011

(30) Foreign Application Priority Data

Mar. 17, 2010 (KR) .......................... 10-2010-0023753
Jul. 30, 2010 (KR) .......................... 10-2010-0074077

(51) Int. Cl.
*H01L 27/32* (2006.01)
*H01L 51/50* (2006.01)

(52) U.S. Cl.
USPC .... 257/59; 257/40; 257/E33.001; 257/E51.022; 257/89; 257/222; 257/258; 257/291; 257/440; 257/72; 257/90

(58) Field of Classification Search
USPC ............... 359/296; 345/107, 88, 690; 349/89; 257/59, 40, E33.001, E51.022
See application file for complete search history.

(56) References Cited

U.S. PATENT DOCUMENTS

| | | | | |
|---|---|---|---|---|
| 5,548,425 A * | 8/1996 | Adachi et al. | ................. | 349/112 |
| 6,377,757 B2 * | 4/2002 | Matsuura et al. | ................. | 399/1 |
| 6,515,790 B2 * | 2/2003 | Miyamoto et al. | ............ | 359/296 |
| 6,686,940 B2 * | 2/2004 | Matsuura et al. | ............ | 347/112 |
| 6,741,386 B2 * | 5/2004 | Minami | ........................ | 359/296 |
| 6,862,016 B2 * | 3/2005 | Matsuura et al. | ............. | 345/107 |
| 7,852,547 B2 * | 12/2010 | Kim | ................................ | 359/296 |
| 8,040,593 B2 * | 10/2011 | Nam et al. | .................... | 359/296 |
| 8,111,447 B2 * | 2/2012 | Fairly et al. | .................... | 359/296 |
| 2003/0156314 A1 * | 8/2003 | Shinozaki et al. | ............ | 359/273 |
| 2003/0214567 A1 * | 11/2003 | Kanazawa et al. | ............ | 347/112 |
| 2004/0145562 A1 * | 7/2004 | Horikiri | ........................ | 345/107 |
| 2006/0285067 A1 | 12/2006 | Kim | | |
| 2007/0045685 A1 * | 3/2007 | Yang et al. | ..................... | 257/294 |
| 2009/0180170 A1 | 7/2009 | Kokeguchi et al. | | |
| 2009/0220742 A1 * | 9/2009 | Wang et al. | .................... | 428/147 |
| 2009/0316253 A1 * | 12/2009 | Fairley et al. | ................. | 359/292 |
| 2010/0157410 A1 * | 6/2010 | Kim et al. | ..................... | 359/291 |

FOREIGN PATENT DOCUMENTS

| | | |
|---|---|---|
| JP | 2005283789 | 10/2005 |
| JP | 2007003552 | 1/2007 |
| JP | 2007334126 | 12/2007 |
| JP | 2009128385 | 6/2009 |
| JP | 2009230060 | 10/2009 |

(Continued)

*Primary Examiner* — Zandra Smith
*Assistant Examiner* — Tsz Chiu
(74) *Attorney, Agent, or Firm* — Cantor Colburn LLP

(57) ABSTRACT

A flat panel display includes; a first substrate, a white reflective layer disposed on the first substrate, a pixel electrode disposed on the white reflective, a second substrate disposed facing the first substrate, a common electrode disposed on the second substrate, and an electrooptic layer disposed between the pixel electrode and the common electrode, wherein the white reflective layer includes at least one of $TiO_2$ and $BaSO_4$.

19 Claims, 21 Drawing Sheets

(56) References Cited

FOREIGN PATENT DOCUMENTS

| KR | 1020050067257 | 7/2005 |
| KR | 1020060030630 | 4/2006 |
| KR | 1020070096511 | 10/2007 |
| KR | 1020080085211 | 9/2008 |
| KR | 1020090058415 | 6/2009 |

* cited by examiner

FLAT PANEL DISPLAY

This application claims priority to Korean Patent Application No. 10-2010-0023753, filed on Mar. 17, 2010, and Korean Patent Application No. 10-2010-0074077, filed on Jul. 30, 2010, and all the benefits accruing therefrom under 35 U.S.C. §119, the contents of which in their entirety are herein incorporated by reference.

BACKGROUND OF THE INVENTION (a) Field of the Invention

The present invention relates to a flat panel display. More particularly, the present invention relates to a flat panel display capable of improving reflectivity, implementing various colors, and increasing luminance thereof.

(b) Description of the Related Art

Flat panel displays generally known in the art include liquid crystal displays ("LCDs"), plasma display panels ("PDPs"), organic light emitting diode ("OLED") displays, field effect displays ("FEDs"), eletrophoretic displays ("EPDs"), electrowetting displays ("EWD") and various other similar displays.

Among them, the flat panel display typically used for an electronic book includes the EPD, the EWD, a bi-stable liquid crystal display and various other similar displays, which are reflective flat panel displays.

Among them, the electrowetting display is driven in a manner that changes surface tension of liquid by applying voltage to an aqueous liquid, that is an electrolyte, to reflect light input from the outside, thereby displaying an image.

The light incident to the electrowetting display is partially absorbed into other layers therein, such that only the non-absorbed light is reflected to display an image, thereby degrading the reflectivity of the display.

In addition, in order for a white reflective layer used for the reflective flat panel display to have a high reflectivity while exhibiting a desired surface effect similar to paper, the white reflective layer may have a thickness of 40 μm or more. When the white reflective layer with a thickness of 40 μm or more is disposed under a pixel electrode, it is difficult to pattern contact holes in the white reflective layer. When the white reflective layer is disposed on the pixel electrode, the white reflective layer serves as an insulating layer and may undesirably cause a drop in a voltage applied between a common electrode and the pixel electrode.

BRIEF SUMMARY OF THE INVENTION

The present invention has been made in an effort to provide a reflective flat panel display capable of improving reflectivity, implementing various colors, increasing luminance, and being bendable similar to paper.

An exemplary embodiment of the present invention provides a flat panel display that includes; a first substrate; a white reflective layer disposed on the first substrate, a pixel electrode disposed on the white reflective layer, a second substrate disposed opposite to the first substrate, a common electrode disposed on the second substrate, and an electrooptic layer disposed between the pixel electrode and the common electrode, wherein the white reflective layer includes titanium oxide ("$TiO_2$") or barium sulfate ("$BaSO_4$").

In one exemplary embodiment, the electrooptic layer may include a hydrophobic insulating layer disposed on the pixel electrode, a barrier rib disposed on the hydrophobic insulating layer and having an opening, and a black oil layer disposed in the opening.

In one exemplary embodiment, the flat panel display may further include an auxiliary reflective layer formed between the first substrate and the white reflective layer.

In one exemplary embodiment, the auxiliary reflective layer may be a metal layer including aluminum.

In one exemplary embodiment, the content of the $TiO_2$ of the white reflective layer may be about 20 wt % to about 80 wt %.

In one exemplary embodiment, the content of $BaSO_4$ of the white reflective layer may be about 20 wt % to about 80 wt %.

In one exemplary embodiment, the white reflective layer may have a thickness of about 3 μm or less.

In one exemplary embodiment, the flat panel display may further include a color filter disposed between the white reflective layer and the pixel electrode.

In one exemplary embodiment, the pixel electrode may be a transparent electrode.

In one exemplary embodiment, the flat panel display may further include a thin film transistor disposed on the first substrate, and the white reflective layer may cover the thin film transistor.

In one exemplary embodiment, the flat panel display may further include a common electrode line disposed on the same layer as the pixel electrode, e.g., at a same distance from the substrate.

In one exemplary embodiment, the flat panel display may further include a contact hole through which the thin film transistor is connected to the pixel electrode, and the contact hole is disposed adjacent to the common electrode line.

In one exemplary embodiment, the thin film transistor may include a gate line and a gate electrode disposed on the first substrate, a gate insulating layer disposed on the gate line and the gate electrode, a semiconductor layer disposed on the gate insulating layer, and a data line crossing the gate line, a source electrode and a drain electrode.

In one exemplary embodiment, the common electrode line may be disposed substantially in parallel to the gate line.

In one exemplary embodiment, the common electrode line may be disposed substantially in parallel to the data line.

In one exemplary embodiment, a common voltage applied to the common electrode line may be greater in magnitude than a common voltage applied to the common electrode.

In one exemplary embodiment, the electrooptic layer may include a barrier rib disposed between the first substrate and the second substrate and have an opening through which the pixel electrode is exposed, and a plurality of charged particle may be disposed in the opening.

In one exemplary embodiment, the flat panel display may further include an auxiliary reflective layer disposed between the first substrate and the white reflective layer.

In one exemplary embodiment, the auxiliary reflective layer may be a metal layer including aluminum.

In one exemplary embodiment, the content of the $TiO_2$ of the white reflective layer may be about 20 wt % to about 80 wt %.

In one exemplary embodiment, the content of $BaSO_4$ of the white reflective layer may be about 20 wt % to about 80 wt %.

In one exemplary embodiment, the white reflective layer may have a thickness of about 3 μm or less.

In one exemplary embodiment, the flat panel display may further include a color filter disposed between the white reflective layer and the pixel electrode.

In one exemplary embodiment, the pixel electrode may be a transparent electrode.

In one exemplary embodiment, the electrooptic layer may be a bi-stable liquid crystal layer.

In one exemplary embodiment, the flat panel display may further include an auxiliary reflective layer disposed between the first substrate and the white reflective layer.

In one exemplary embodiment, the auxiliary reflective layer may be a metal layer including aluminum.

In one exemplary embodiment, the content of the $TiO_2$ of the white reflective layer may be about 20 wt % to about 80 wt %.

In one exemplary embodiment, the content of $BaSO_4$ of the white reflective layer may be about 20 wt % to about 80 wt %.

In one exemplary embodiment, the white reflective layer may have a thickness of about 3 μm or less.

In one exemplary embodiment, the flat panel display may further include a color filter disposed between the white reflective layer and the pixel electrode.

In one exemplary embodiment, the pixel electrode may be a transparent electrode.

In one exemplary embodiment, the flat panel display may further include a thin film transistor disposed on the first substrate, and the white reflective layer may cover the thin film transistor.

Another exemplary embodiment of the present invention provides a flat panel display that includes; a first substrate, a pixel electrode disposed on the first substrate, a white reflective layer disposed on the pixel electrode, a second substrate disposed substantially opposite to the first substrate, a common electrode disposed on the second substrate and an electrooptic layer disposed between the white reflective layer and the common electrode, wherein the white reflective layer includes at least one of $TiO_2$ and $BaSO_4$.

In one exemplary embodiment, the electrooptic layer may include a hydrophobic insulating layer disposed on the white reflective layer, a barrier rib disposed on the hydrophobic insulating layer and having an opening, and a black oil layer disposed in the opening.

In one exemplary embodiment, the pixel electrode may be a metal layer including aluminum.

In one exemplary embodiment, the content of the $TiO_2$ of the white reflective layer may be about 20 wt % to about 80 wt %.

In one exemplary embodiment, the content of $BaSO_4$ of the white reflective layer may be about 20 wt % to about 80 wt %.

In one exemplary embodiment, the white reflective layer may have a thickness of about 3 μm or less.

In one exemplary embodiment, the electrooptic layer may include a barrier rib disposed between the first substrate and the second substrate and having an opening through which the pixel electrode is exposed, and a plurality of charged particles disposed in the opening.

In one exemplary embodiment, the pixel electrode may be a metal layer including aluminum.

In one exemplary embodiment, the content of the $TiO_2$ of the white reflective layer may be about 20 wt % to about 80 wt %.

In one exemplary embodiment, the content of $BaSO_4$ of the white reflective layer may be about 20 wt % to about 80 wt %.

In one exemplary embodiment, the white reflective layer may has a thickness of about 3 μm or less.

In one exemplary embodiment, the electrooptic layer may be a bi-stable liquid crystal layer.

In one exemplary embodiment, the pixel electrode may be a metal layer including aluminum.

In one exemplary embodiment, the content of the $TiO_2$ of the white reflective layer may be about 20 wt % to about 80 wt %.

In one exemplary embodiment, the content of $BaSO_4$ of the white reflective layer may be about 20 wt % to about 80 wt %.

In one exemplary embodiment, the white reflective layer may have a thickness of about 3 μm or less.

Yet another exemplary embodiment of the present invention provides a flat panel display that includes; a first substrate, a common electrode disposed on the first substrate, a white reflective layer disposed on the common electrode, a second substrate disposed substantially opposite to the first substrate, a pixel electrode disposed on the second substrate and an electrooptic layer disposed between the white reflective layer and the pixel electrode, wherein the white reflective layer includes at least one of $TiO_2$ and $BaSO_4$.

In one exemplary embodiment, the electrooptic layer may include a hydrophobic insulating layer disposed on the white reflective layer, a barrier rib disposed on the hydrophobic insulating layer and having an opening, and a black oil layer disposed in the opening.

In one exemplary embodiment, the flat panel display may further include a thin film transistor formed between the second substrate and the pixel electrode, and a light blocking layer is disposed between the second substrate and the thin film transistor.

Still another exemplary embodiment of the present invention provides a flat panel display that includes; a first substrate on which a plurality of pixel domains including a thin film transistor domain and a display domain is formed, a gate line and a gate electrode disposed on the first substrate, gate insulating layers disposed on the gate line and the gate electrode, a semiconductor layer disposed on the gate insulating layer, a data line crossing the gate line, a source electrode, and a drain electrode, a passivation layer disposed on the data line, the source electrode, and the drain electrode, a pixel electrode disposed on the passivation layer and connected to the drain electrode, a second substrate disposed substantially opposite to the first substrate, a common electrode disposed on the second substrate, and an electrooptic layer disposed between the pixel electrode and the common electrode, wherein the drain electrode is positioned to overlap with the pixel electrode in the thin film transistor domain and the display domain and includes an upper drain electrode and a lower drain electrode and the upper drain electrode is made of a reflective material.

In one exemplary embodiment, the electrooptic layer may include a hydrophobic insulating layer disposed on the pixel electrode, a barrier rib disposed on the hydrophobic insulating layer and having an opening and a black oil layer disposed in the opening.

In one exemplary embodiment, the upper drain electrode may be made of metal including aluminum.

In one exemplary embodiment, the lower drain electrode may be made of metal including at least one of molybdenum and titanium.

In one exemplary embodiment, the flat panel display may further include contact holes formed on the passivation layer and the upper drain electrode to expose the lower drain electrode, wherein the pixel electrode may be connected to the lower drain electrode through the contact holes.

In one exemplary embodiment, the passivation layer may include the lower passivation layer and the upper passivation layer, wherein the lower passivation layer may be made of an inorganic insulating material and the upper passivation layer may be made of an organic insulating material.

In one exemplary embodiment, the flat panel display may further include a color filter disposed between the passivation layer and the pixel electrode.

In one exemplary embodiment, the color filter may include a quantum dot.

In one exemplary embodiment, the first substrate and the second substrate may be a flexible substrate.

In one exemplary embodiment, the first substrate and the second substrate may be made of plastic or glass fiber reinforced plastic ("FRP").

Still yet another exemplary embodiment of the present invention provides a flat panel display that includes; a first substrate on which a plurality of pixel domain including a thin film transistor domain and a display domain is formed, a gate line and a gate electrode disposed on the first substrate, gate insulating layers disposed on the gate line and the gate electrode, a semiconductor layer disposed on the gate insulating layer; a data line crossing the gate line, a source electrode, and a drain electrode, a passivation layer disposed on the data line, the source electrode, and the drain electrode, a white reflective layer disposed on the passivation layer, a pixel electrode disposed on the white reflective layer and connected to the drain electrode, a second substrate disposed substantially opposite to the first substrate, a common electrode disposed on the second substrate and an electrooptic layer disposed between the pixel electrode and the common electrode, wherein the drain electrode is positioned to overlap with the pixel electrode in the thin film transistor domain and the display domain and includes an upper drain electrode and a lower drain electrode and the upper drain electrode is made of a reflective material.

In one exemplary embodiment, the white reflective layer may be made of material including at least one of $TiO_2$ and $BaSO_4$ In one exemplary embodiment, the content of the $TiO_2$ of the white reflective layer may be about 20 wt % to about 80 wt %.

In one exemplary embodiment, the content of $BaSO_4$ of the white reflective layer may be about 20 wt % to about 80 wt %.

In one exemplary embodiment, the electrooptic layer may include a hydrophobic insulating layer disposed on the pixel electrode, a barrier rib disposed on the hydrophobic insulating layer and having an opening, and a black oil layer disposed in the opening.

In one exemplary embodiment, the upper drain electrode may be made of metal including aluminum.

In one exemplary embodiment, the lower drain electrode may be made of metal including at least one of molybdenum and titanium.

In one exemplary embodiment, the flat panel display may further include contact holes formed on the passivation layer, the upper drain electrode and the white reflective layer to expose the lower drain electrode, wherein the pixel electrode may be connected to the lower drain electrode through the contact holes.

In one exemplary embodiment, the passivation layer may include the lower passivation layer and the upper passivation layer, wherein the lower passivation layer may be made of an inorganic insulating material and the upper passivation layer may be made of an organic insulating material.

In one exemplary embodiment, the flat panel display may further include a color filter disposed between the white reflective layer and the pixel electrode.

In one exemplary embodiment, the color filter may include a quantum dot.

In one exemplary embodiment, the first substrate and the second substrate may be a flexible substrate.

In one exemplary embodiment, the first substrate and the second substrate may be made of plastic or FRP.

According to the exemplary embodiments of the present invention, the white reflective layer including $TiO_2$ or $BaSO_4$ is formed, so that reflectivity can be improved.

Furthermore, the auxiliary reflective layer is formed under the white reflective layer including $TiO_2$ or $BaSO_4$, so that the reflectivity can be further improved.

Furthermore, the thickness of the white reflective layer can be reduced, so that the white reflective layer can be formed on or under the pixel electrode without limitation.

In addition, since the reflectivity of the white reflective layer is high, the color filter can be formed on the white reflective layer to represent colors.

Furthermore, the reflectivity of the flat panel display can be improved by forming the upper drain electrode with a reflective metal.

Furthermore, the reflectivity of the flat panel display can be further improved by further forming the white reflective layer and the organic insulating layer.

In addition, various colors can be implemented and luminance can be increased by forming the color filter using the quantum dot.

Further, a display which is bendable like paper can be implemented by forming the first and second substrates as flexible substrates.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION OF THE EMBODIMENTS

Figure 1:
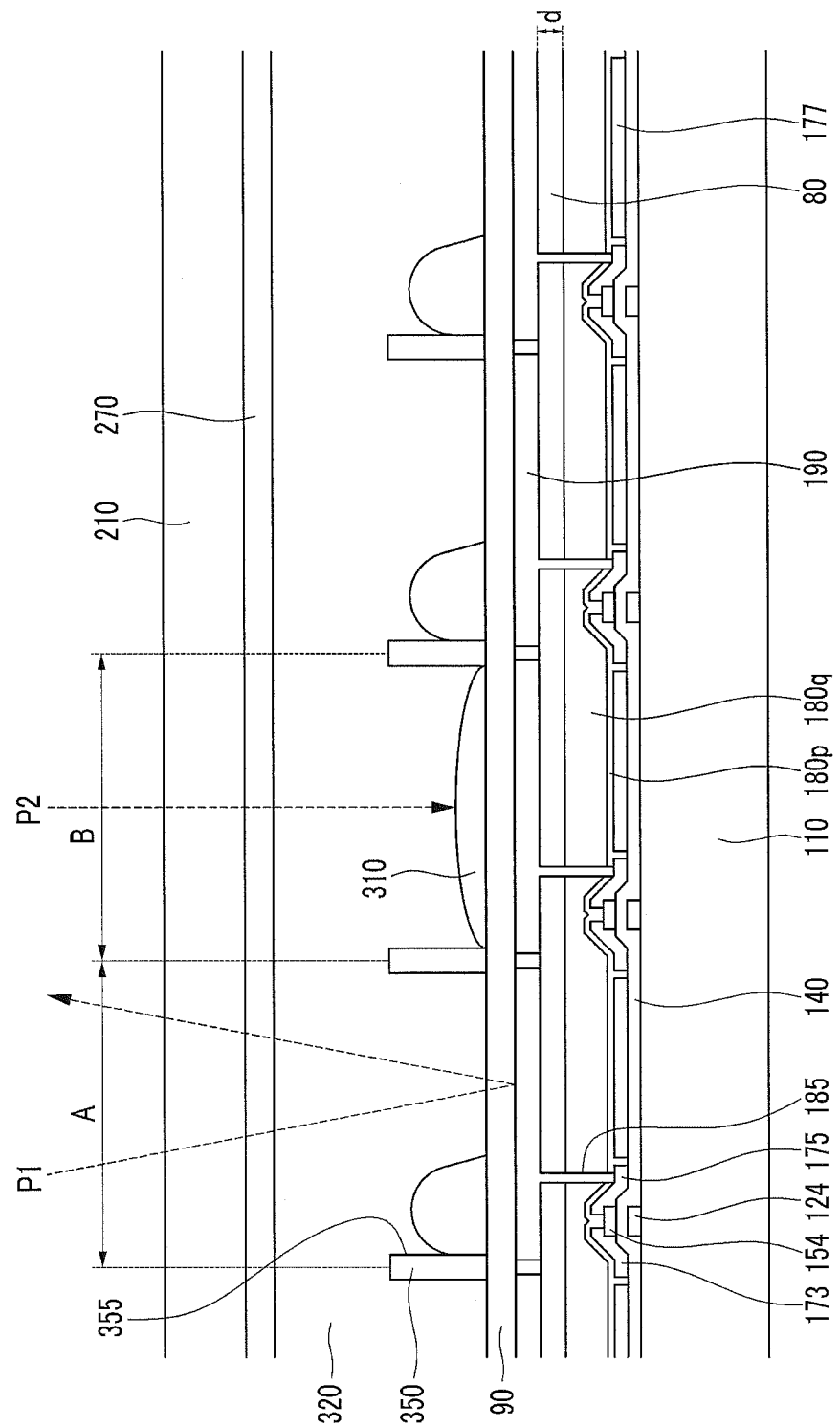
FIG. 1 is a cross-sectional view of a first exemplary embodiment of a flat panel display according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be described in detail with reference to the accompanying drawings.

A first exemplary embodiment of a flat panel display according to the present invention will be described with reference to FIG. 1.

FIG. 1 is a cross-sectional view of the first exemplary embodiment of a flat panel display according to the present invention.

As shown in FIG. 1, the flat panel display is a reflective electrowetting display which includes a lower substrate 110 on which a pixel electrode 190 is formed, an upper substrate 210 on which a common electrode 270 is formed while facing the lower substrate 110, and electrooptic layers 310 and 350 disposed between the lower substrate 110 and the upper substrate 210. The electrooptic layers 310 and 350 include barrier ribs 350 having a plurality of openings 355 and black oil layers 310 disposed in the openings 355.

Gate electrodes 124 are formed on the lower substrate 110, exemplary embodiments of which may be made of glass, a flexible substrate or other materials with similar characteristics to be connected to a plurality of gate lines mainly extending in a horizontal direction.

In one exemplary embodiment, a gate insulating layer 140 made of silicon nitride (SiNx) or other materials with similar characteristics is formed on the gate lines and the gate electrodes 124.

A semiconductor layer 154 made of hydrogenated amorphous silicon or other materials with similar characteristics is formed on the gate insulating layer 140.

The semiconductor layer 154 forms a channel of a thin film transistor ("TFT").

Date lines and drain electrodes 175 are formed on the gate insulating layer 140 and the semiconductor layer 154.

The data lines mainly extend in a vertical direction while crossing the gate lines, and a branch from each data line forms a source electrode 173.

A pair of the source electrode 173 and the drain electrode 175 are partially disposed on the semiconductor layer 154, respectively, while being spaced apart from each other with respect to the semiconductor layer 154, and are disposed opposite to each other with respect to the gate electrode 124.

An auxiliary reflective layer 177 is formed on the same layer as the source electrode 173 and the drain electrode 175, e.g., at a same distance from the underlying substrate 110.

Such an auxiliary reflective layer 177 may be made of the same material as the source electrode 173 and the drain electrode 175, and in one exemplary embodiment is a metal layer including aluminum.

An ohmic contact is disposed among the semiconductor layer 154, the source electrode 173 and the drain electrode 175 to reduce contact resistance among the various layers.

An interlayer insulating layer 180p made of insulating material such as silicon oxide, silicon nitride or other material with similar characteristics is formed on the source electrode 173, the drain electrode 175, the semiconductor layer 154 and the gate insulating layer 140 to cover an exposed part of the semiconductor layer 154, and a passivation layer 180q having superior planarization characteristics, and in one exemplary embodiment being made of organic insulating material, is formed on the interlayer insulating layer 180p.

Such a passivation layer 180q is formed with contact holes 185 through which the drain electrodes 175 are exposed.

A white reflective layer 80 is formed on the passivation layer 180q. The white reflective layer 80 may include titanium oxide ($TiO_2$) and resin, or may also include barium sulfate ($BaSO_4$) and resin.

In one exemplary embodiment, the content of the $TiO_2$ of the white reflective layer 80 is about 20 wt % to about 80 wt %, and the content of $BaSO_4$ of the white reflective layer 80 is about 20 wt % to about 80 wt %.

When the content of the $TiO_2$ or the $BaSO_4$ is less than about 20 wt %, the reflectivity of the white reflective layer 80 deteriorates. When the content of the $TiO_2$ or the $BaSO_4$ is more than about 80 wt %, the patterning thereof becomes difficult.

Since the auxiliary reflective layer 177 is formed below the white reflective layer 80, even if the white reflective layer 80 has a thickness "d" of about 2 μm or less, the reflectivity of the white reflective layer 80 does not deteriorate.

Thus, the white reflective layer 80 is formed to have a thickness of about 2 μm or less, so that the contact holes 185 can be easily formed in the white reflective layer 80.

Table 1 below shows the reflectivity according to the thickness of the white reflective layer 80 when the auxiliary reflective layer 177 made of aluminum is formed below the white reflective layer 80.

TABLE 1

| | thickness | | | | | | | | |
|---|---|---|---|---|---|---|---|---|---|
| | 2 μm | 3 μm | 5 μm | 8 μm | 12 μm | 16 μm | 20 μm | 25 μm | 40 μm |
| reflectivity | 94.5% | 94.6% | 94.4% | 94.2% | 93.9% | 93.4% | 93.9% | 94.0% | 93.1% |

As shown in Table 1, even if the white reflective layer 80 has a thickness of about 2 μm, the reflectivity does not significantly deteriorate.

A dielectric constant of the passivation layer 180q is adjusted to form the passivation layer 180q with the white reflective layer 80, so that the manufacturing process can be reduced and the productivity of a display including the same can be improved.

Meanwhile, pixel electrodes 190 made of a transparent conductive material such as indium tin oxide ("ITO") or indium zinc oxide ("IZO") are formed on the white reflective layer 80.

The pixel electrode 190 is physically and electrically connected to the drain electrode 175 through the contact hole 185.

A hydrophobic insulating layer 90 is formed on the pixel electrodes 190, and the barrier ribs 350 are formed on the hydrophobic insulating layer 90.

The barrier ribs 350 are formed in a matrix shape with the openings 355 to define a pixel, and are formed with organic layers including black pigment.

The black oil layer 310 is formed in the opening 355.

An aqueous solution layer 320 is formed between the barrier ribs 350 and the black oil layer 310 and the common electrode 270.

Since when a voltage is not applied a surface tension of the aqueous solution layer 320 does not change in a pixel B between the pixel electrode 190 and the common electrode 270, the black oil layer 310 covers the white reflective layer 80. Thus, since light P2 incident into the opening is absorbed by the black oil layer 310, the pixel B displays a black color.

However, when a voltage is applied the surface tension of the aqueous solution layer 320 changes in a pixel A between the pixel electrode 190 and the common electrode 270; and thus the black oil layer 310 can be compressed. Thus, since light P1 incident into the opening is reflected by the exposed white reflective layer 80, the pixel A displays a white color.

In the present exemplary embodiment, the white reflective layer 80 is disposed below the transparent pixel electrode 190 and the auxiliary reflective layer 177 is formed below the white reflective layer 80. However, alternative exemplary embodiments include configurations wherein the white reflective layer 80 may also be formed on the pixel electrode 190 made of an opaque metal layer.

Hereinafter, an exemplary embodiment of a flat panel display including the pixel electrode 190 made of an opaque metal layer and the white reflective layer 80 formed on the pixel electrode 190 will be described in detail with reference to FIG. 2.

Figure 2:
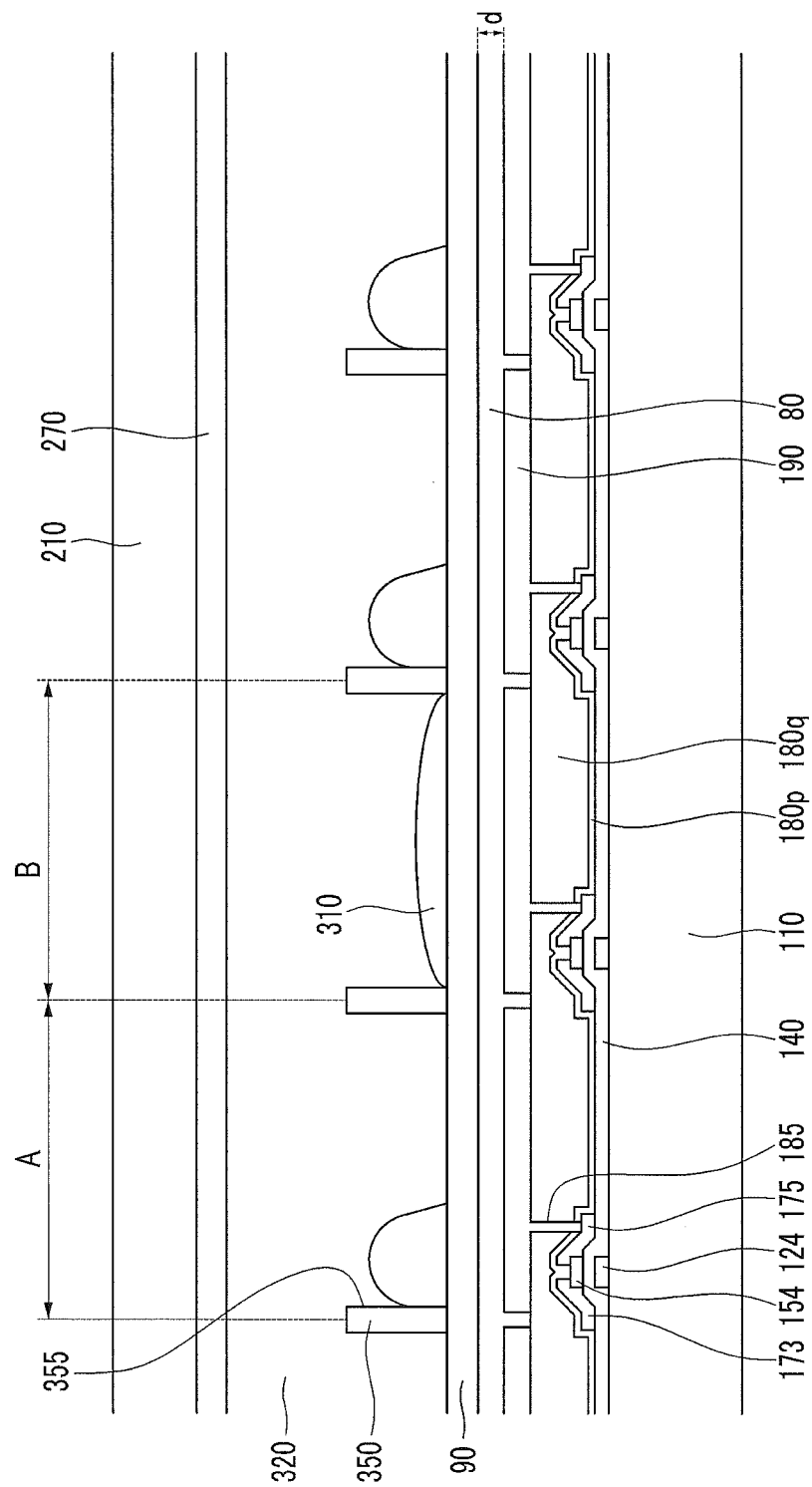
FIG. 2 is a cross-sectional view of a second exemplary embodiment of a flat panel display according to the present invention.

FIG. 2 is a cross-sectional view of a second exemplary embodiment of a flat panel display according to the present invention.

Since the second exemplary embodiment is substantially identical to the first exemplary embodiment shown in FIG. 1, except for the pixel electrode 190 being made of an opaque metal layer and the white reflective layer 80 being formed on the pixel electrode 190, detailed description thereof will be omitted in order to avoid redundancy.

As shown in FIG. 2, in the second exemplary embodiment of a flat panel display according to the present invention, the auxiliary reflective layer 177 may not be formed on the same layer as the source electrode 173 and the drain electrode 175.

The pixel electrode 190 made of an opaque metal layer including aluminum is formed on the passivation layer 180q. The pixel electrode 190 is physically and electrically connected to the drain electrode 175 through the contact hole 185.

The white reflective layer 80 including $TiO_2$ and resin is formed on the pixel electrode 190. Such a white reflective layer 80 may also, or in the alternative, include $BaSO_4$ and resin.

In one exemplary embodiment, the content of the $TiO_2$ of the white reflective layer 80 is about 20 wt % to about 80 wt %, and the content of $BaSO_4$ of the white reflective layer 80 is about 20 wt % to about 80 wt %.

The hydrophobic insulating layer 90 is formed on the white reflective layer 80, and the barrier ribs 350 are formed on the hydrophobic insulating layer 90.

As described above, since the pixel electrode 190 made of an opaque metal layer is formed under the white reflective layer 80, even if the white reflective layer 80 is formed to have a thickness d of about 2 μm or less, the reflectivity does not deteriorate.

Further, since the thickness of the white reflective layer 80 can be reduced, even if the white reflective layer 80 is formed on the pixel electrode 190, voltage drop does not occur between the common electrode 270 and the pixel electrode 190.

Similarly to the first exemplary embodiment shown in FIG. 1, a color filter 230 may also be formed between the pixel electrode 190 and the white reflective layer 80.

Hereinafter, a third exemplary embodiment of a flat panel display in which the color filter 230 is formed between the pixel electrode 190 and the white reflective layer 80 will be described in detail with reference to FIG. 3.

Figure 3:
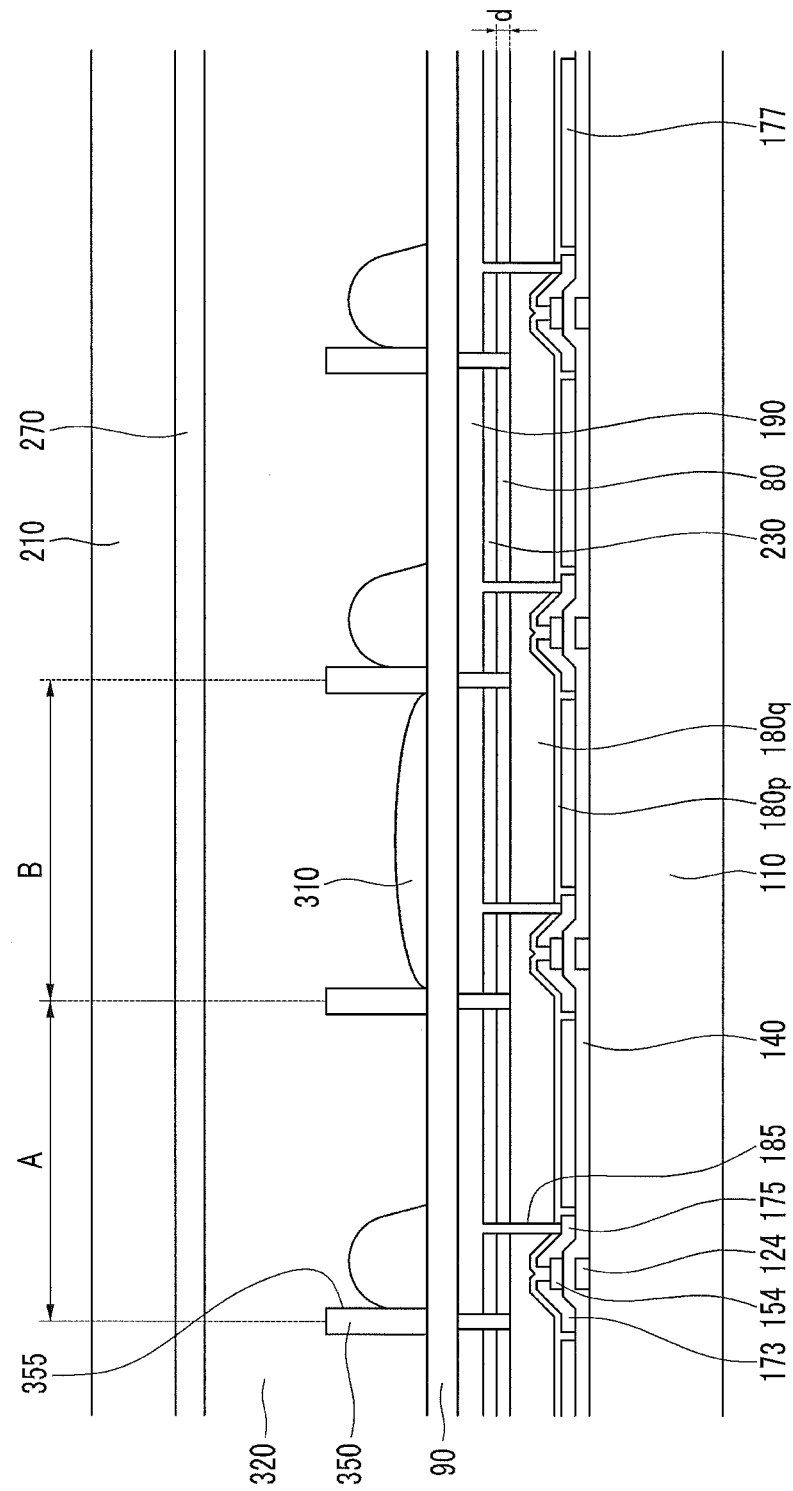
FIG. 3 is a cross-sectional view of a third exemplary embodiment of a flat panel display according to the present invention.

FIG. 3 is a cross-sectional view of the third exemplary embodiment of a flat panel display according to the present invention.

Since the third exemplary embodiment is substantially identical to the first exemplary embodiment shown in FIG. 1, except for the structure in which the color filter 230 is formed between the pixel electrode 190 and the white reflective layer 80, detailed description thereof will be omitted in order to avoid redundancy.

As shown in FIG. 3, the third exemplary embodiment of a flat panel display according to the present invention, the color filter 230 is formed on the white reflective layer 80.

The pixel electrode 190 made of a transparent conductive material such as ITO, IZO or other materials with similar characteristics is formed on the color filter 230.

The pixel electrode 190 is physically and electrically connected to the drain electrode 175 through the contact hole 185.

As described above, since the reflectivity of the white reflective layer 80 is high, even if the color filter 230 is formed on the white reflective layer 80 to represent colors, the contrast ratio of the color is not deteriorated.

In the above exemplary embodiments, the white reflective layer 80 is formed on or under the pixel electrode 190. However, in alternative exemplary embodiments the common electrode 270 may be formed on the lower substrate 110, the pixel electrode 190 may be formed on upper substrate 210, and the white reflective layer 80 may be formed on the common electrode 270.

Hereinafter, a fourth exemplary embodiment of a flat panel display in which the common electrode 270 is formed on the lower substrate 110, the pixel electrode 190 is formed on the upper substrate 210, and the white reflective layer 80 is formed on the common electrode 270 will be described in detail with reference to FIG. 4.

Figure 4:
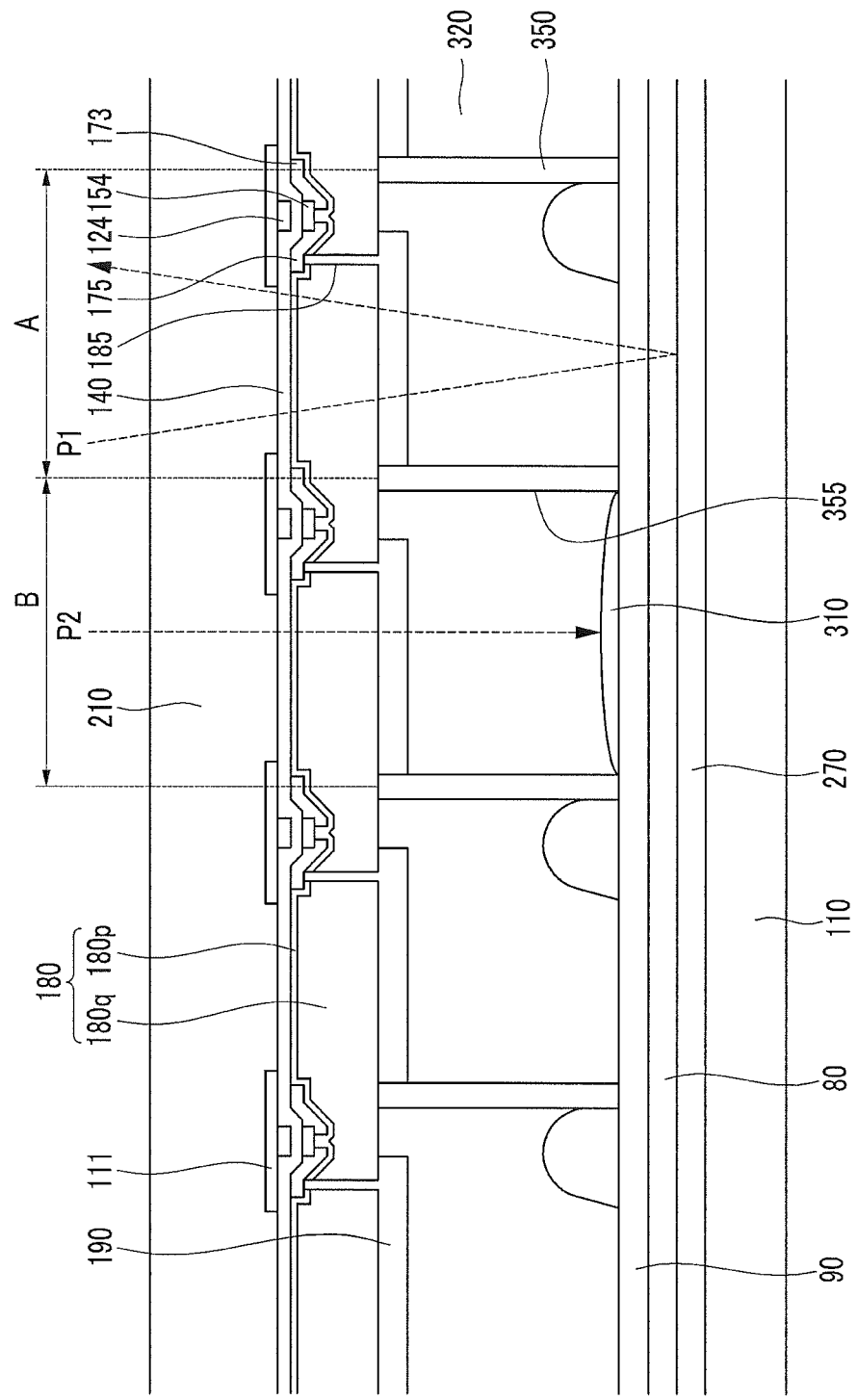
FIG. 4 is a cross-sectional view of a fourth exemplary embodiment of a flat panel display according to the present invention.

FIG. 4 is a cross-sectional view of the fourth exemplary embodiment of a flat panel display according to the present invention.

Since the fourth exemplary embodiment is substantially identical to the first exemplary embodiment shown in FIG. 1, except for the structure in which the common electrode 270 is formed on the lower substrate 110, the pixel electrode 190 is formed on upper substrate 210, and the white reflective layer 80 is formed on the common electrode 270, detailed description thereof will be omitted in order to avoid redundancy.

As shown in FIG. 4, the fourth exemplary embodiment of a flat panel display according to the present invention is a reflective electrowetting display which includes the lower substrate 110 on which the common electrode 270 is formed, the upper substrate 210 facing the lower substrate 110 and on which the pixel electrode 190 is formed, the barrier ribs 350 disposed between the lower substrate 110 and the upper substrate 210 and having a plurality of openings 355, and the black oil layer 310 disposed in the opening 355.

The common electrode 270 is formed on the lower substrate 110 made of glass, a flexible substrate, or other materials with similar characteristics, and the white reflective layer 80 is formed on the common electrode 270.

The hydrophobic insulating layer 90 is formed on the white reflective layer 80, and the barrier ribs 350 are formed on the hydrophobic insulating layer 90.

The barrier ribs 350 are formed in a matrix shape with the openings 355 to form a display portion of a pixel, and are formed with organic layers including black pigment.

The black oil layer 310 is formed in the opening 355.

An aqueous solution layer 320 is formed between the barrier ribs 350 and the black oil layer 310 and the common electrode 270.

The gate lines and the gate electrodes 124 are formed on the upper substrate 210 made of glass, a flexible substrate, or other materials with similar characteristics.

A light blocking layer 111 is formed between the upper substrate 210 and the gate electrode 124 to prevent inflow of external incident light to the semiconductor layer 154.

Such a light blocking layer 111 covers a TFT including the gate electrode 124, the semiconductor layer 154, the source electrode 173 and the drain electrode 175.

In one exemplary embodiment, the pixel electrode 190 is not formed at a position corresponding to such a light blocking layer 111.

In such an exemplary embodiment, when a voltage is applied between the common electrode 270 and the pixel electrode 190, the compressed black oil layer 310 is collected at a position corresponding to the light blocking layer 111, resulting in an improvement of luminance.

Furthermore, since the white reflective layer 80 is formed on the common electrode 270, a separate patterning process is not necessary to form the white reflective layer 80, so that the white reflective layer 80 can be thickly formed, resulting in an improvement of the reflectivity.

Meanwhile, in the first exemplary embodiment shown in FIG. 1, in order to facilitate the movement of the black oil layer 310, the contact hole 185 may also be formed adjacent to a common electrode line 195 formed on the same layer as the pixel electrode 190.

Hereinafter, a fifth exemplary embodiment of a flat panel display in which the contact hole 185 is formed adjacent to the common electrode line 195 formed on the same layer as the pixel electrode 190 will be described in detail with reference to FIGS. 5 to 7.

Figure 5:
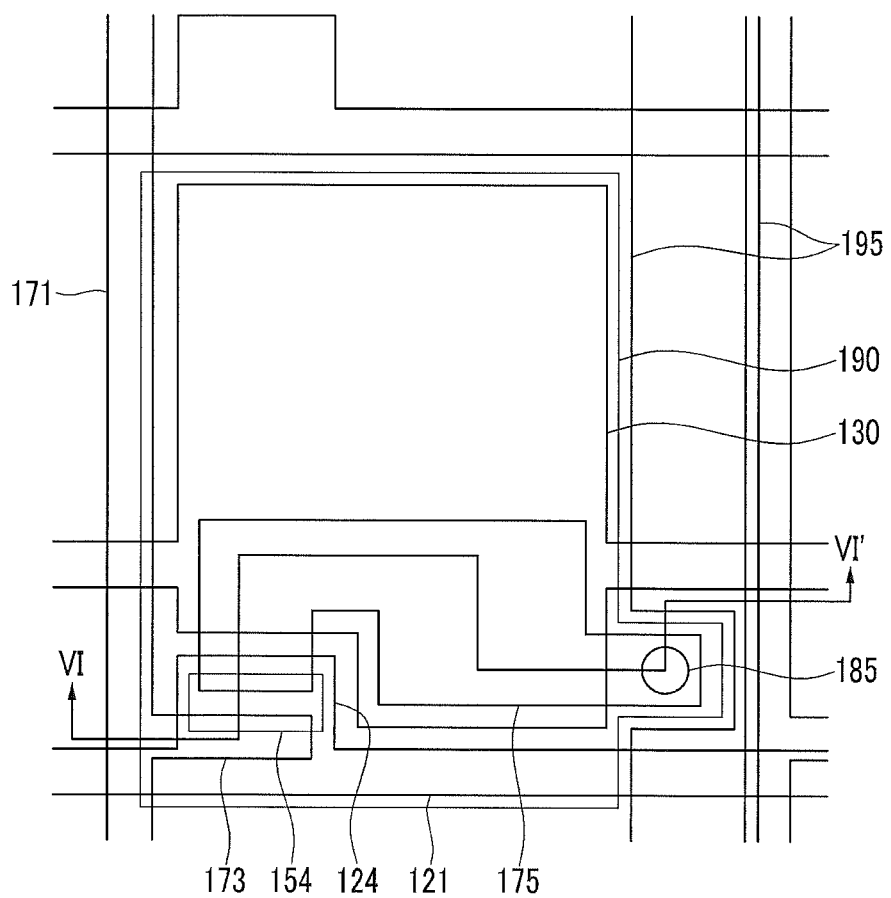
FIG. 5 is a top plan layout view of a fifth exemplary embodiment of a flat panel display according to the present invention.
Figure 6:
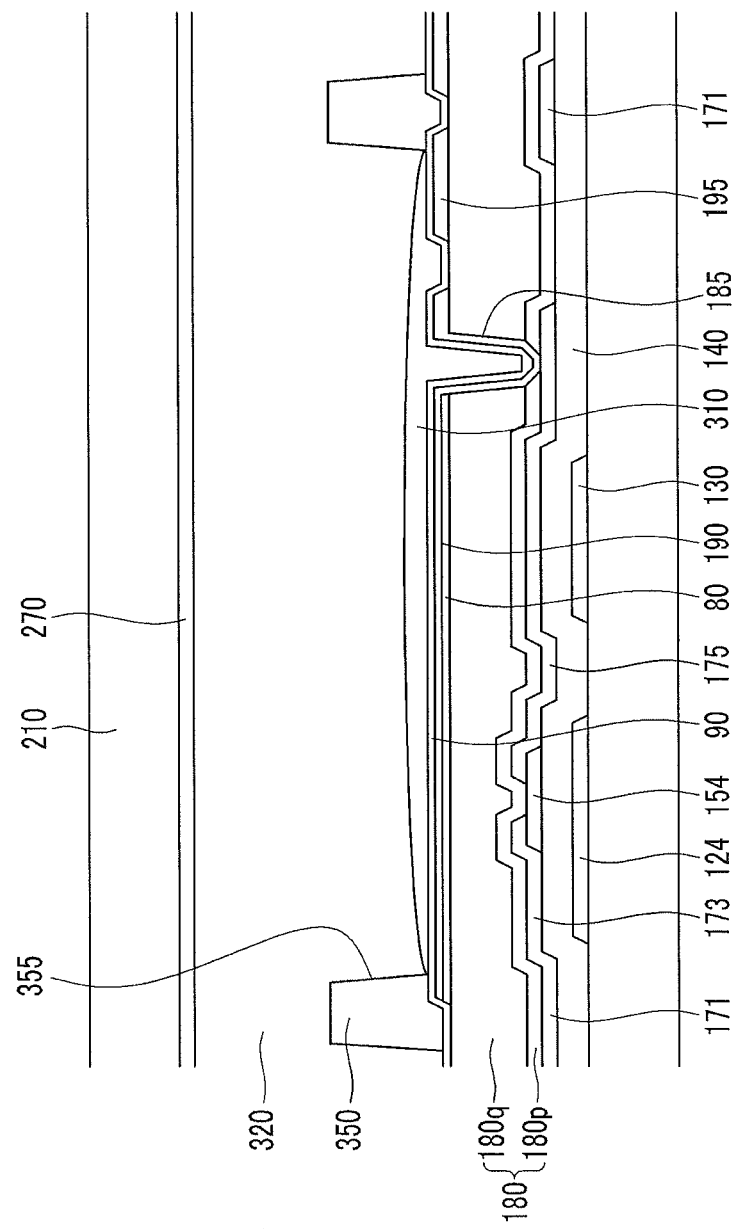
FIG. 6 is a cross-sectional view taken along line VI-VI' of FIG. 5.
Figure 7:
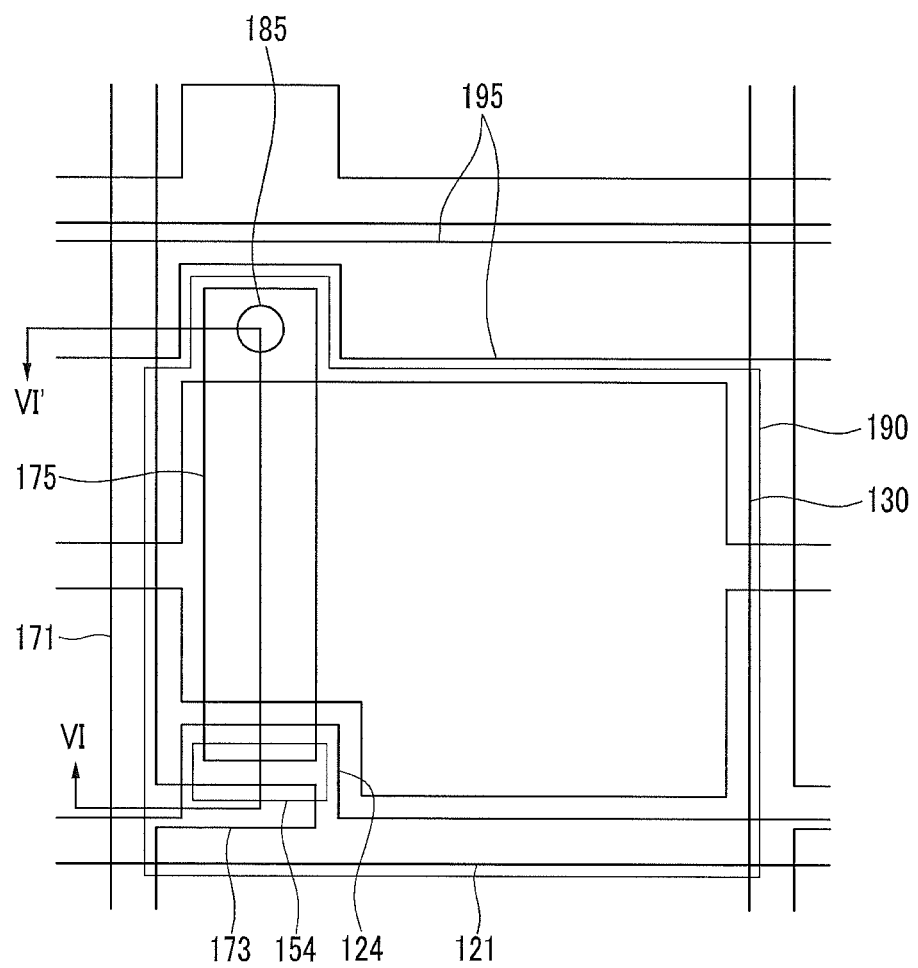
FIG. 7 is a top plan layout view of a sixth exemplary embodiment of a flat panel display according to the present invention.

FIG. 5 is a top plan layout view of the fifth exemplary embodiment of a flat panel display according to the present invention, FIG. 6 is a cross-sectional view taken along line VI-VI' of FIG. 5, and FIG. 7 is a top plan layout view of a sixth exemplary embodiment of a flat panel display according to the present invention.

As shown in FIG. 5, the fifth exemplary embodiment of a flat panel display according to the present invention is a reflective electrowetting display which includes the lower substrate 110 on which the pixel electrode 190 is formed, the upper substrate 210 facing the lower substrate 110 and on which the common electrode 270 is formed, the barrier ribs 350 disposed between the lower substrate 110 and the upper substrate 210 and having a plurality of openings 355, and the black oil layer 310 disposed in the opening 355.

The gate electrodes 124 are formed on the lower substrate 110 made of glass, flexible substrate or other materials with similar characteristics to be connected to a plurality of gate lines 121 mainly extending in the horizontal direction.

A sustain electrode 130, also referred to as a storage electrode, disposed on the same layer as the gate line 121 and the gate electrode 124 is formed over the opening 355.

The gate insulating layer 140, exemplary embodiments of which may be made of SiNx or other materials with similar characteristics, is formed on the gate line 121, the gate electrodes 124 and the sustain electrode 130.

The semiconductor layer 154 made of hydrogenated amorphous silicon or other materials with similar characteristics is formed on the gate insulating layer 140.

The semiconductor layer 154 forms a channel of a TFT.

Data lines 171 and the drain electrodes 175 are formed on the gate insulating layer 140 and the semiconductor layer 154.

The data lines 171 cross the gate lines and mainly extend in the vertical direction, and a branch from each data line 171 forms the source electrode 173.

A pair of the source electrode 173 and the drain electrode 175 are partially disposed on the semiconductor layer 154, respectively, while being spaced apart from each other, and are disposed opposite to each other with respect to the gate electrode 124.

An ohmic contact is disposed among the semiconductor layer 154, the data line 171 and the drain electrode 175 to reduce contact resistance between the semiconductor layer 154 and the data line 171 and between the semiconductor layer 154 and the drain electrode 175.

An interlayer insulating layer 180p made of insulating material such as silicon oxide, silicon nitride or other materials with similar characteristics is formed on the source electrode 173, the drain electrode 175, the semiconductor layer 154 and the gate insulating layer 140 to cover an exposed part of the semiconductor layer 154, and a passivation layer 180q having superior planarization characteristics and, in one exemplary embodiment being made of organic insulating material, is formed on the interlayer insulating layer 180p.

The passivation layer 180q is formed with contact holes 185 through which the drain electrodes 175 are exposed.

The white reflective layer 80 is formed on the passivation layer 180q. In one exemplary embodiment, the white reflective layer 80 may include $TiO_2$ and resin, or may also include $BaSO_4$ and resin.

In one exemplary embodiment, the content of the $TiO_2$ of the white reflective layer 80 is about 20 wt % to about 80 wt %, and the content of $BaSO_4$ of the white reflective layer 80 is about 20 wt % to about 80 wt %.

When the content of the $TiO_2$ or the $BaSO_4$ is less than about 20 wt %, the reflectivity deteriorates. When the content of the $TiO_2$ or the $BaSO_4$ is more than about 80 wt %, the patterning becomes difficult.

The pixel electrodes 190 made of a transparent conductive material, exemplary embodiments of which include ITO, IZO and other materials with similar characteristics are formed on the white reflective layer 80.

The pixel electrode 190 is physically and electrically connected to the drain electrode 175 through the contact hole 185.

In the present exemplary embodiment, the common electrode line 195 to which a common voltage is applied is formed on the same layer as the pixel electrode 190.

As shown in FIG. 5, the common electrode line 195 may also be disposed in parallel to the data line 171. Alternative exemplary embodiments include configurations wherein, as shown in FIG. 7, the common electrode line 195 may also be disposed in parallel to the gate line 121. In one exemplary embodiment, the common electrode line 195 is disposed adjacent to the contact hole 185.

Thus, even if movement of the black oil layer 310 is not facilitated due to a stepped portion of the contact hole 185, since the common electrode line 195 formed corresponding to the region in which the black oil layer 310 is collected is disposed adjacent to the contact hole 185, influence due to the stepped portion of the contact hole 185 can be minimized and the reflectivity can be improved.

Furthermore, in one exemplary embodiment, the common voltage applied to the common electrode line 195 is greater in magnitude than the common voltage applied to the common electrode 270.

In such an exemplary embodiment, since the common electrode 270 and the common electrode line 195 are equipotential, the black oil layer 310 is easily collected on the common electrode line 195, resulting in the improvement of the luminance and the reflectivity of the display.

The hydrophobic insulating layer 90 is formed on the pixel electrodes 190, and the barrier ribs 350 are formed on the hydrophobic insulating layer 90. The barrier ribs 350 are formed in a matrix shape with the openings 355 to form a pixel, and are formed with organic layers including black pigment. The black oil layer 310 is then deposited in the opening 355.

The aqueous solution layer 320 is formed between the barrier ribs 350 and the black oil layer 310 and the common electrode 270.

Further, the auxiliary reflective layer 177 is further formed below the white reflective layer 80 of the flat panel display according to the present exemplary embodiment, so that the thickness of the white reflective layer 80 can be reduced.

Hereinafter, the structure of a fifth exemplary embodiment in which the auxiliary reflective layer 177 is further formed below the white reflective layer 80 of the flat panel display according to the present invention will be described with reference to FIG. 8.

Figure 8:
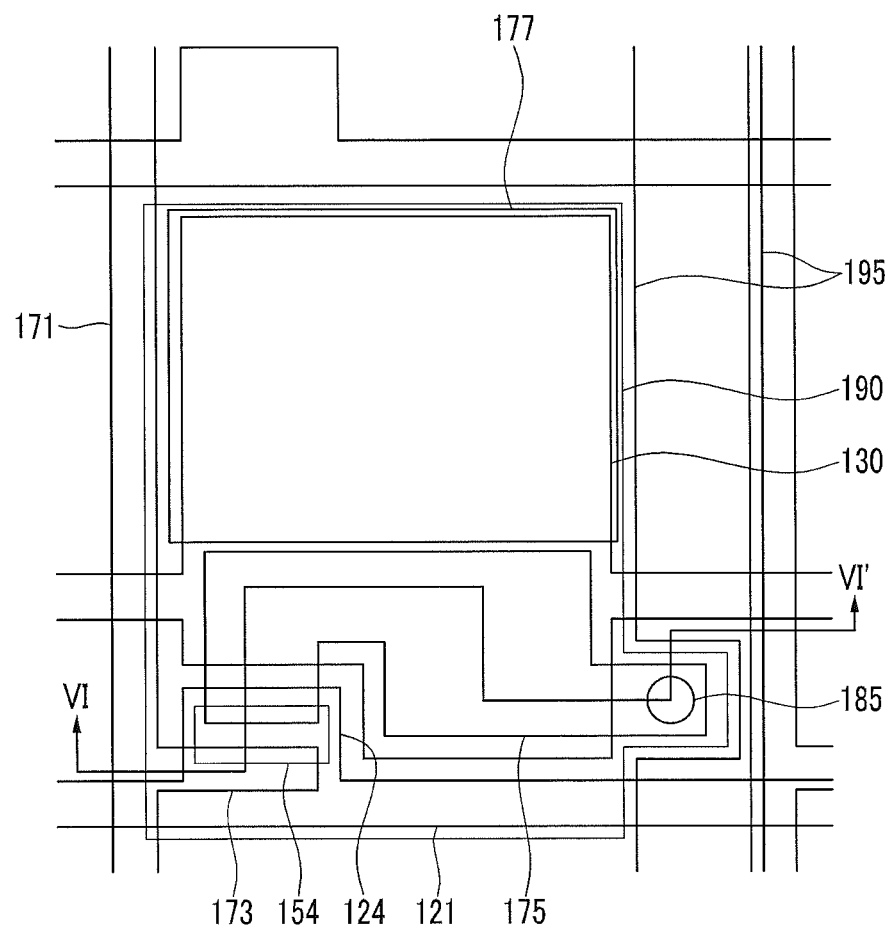
FIG. 8 is a top plan layout view of a seventh exemplary embodiment of a flat panel display according to the present invention.

FIG. 8 is a top plan layout view of a seventh exemplary embodiment of a flat panel display according to the present invention.

Since the seventh exemplary embodiment is substantially identical to the previous exemplary embodiment shown with respect to FIG. 5, except for the structure in which the auxiliary reflective layer 177 is further formed below the white reflective layer 80, detailed description thereof will be omitted in order to avoid redundancy.

As shown in FIG. 8, in the seventh exemplary embodiment of a flat panel display according to the present invention, the auxiliary reflective layer 177 is formed on the same layer as the source electrode 173 and the drain electrode 175.

Such an auxiliary reflective layer 177 may be made of substantially the same material as the source electrode 173 and the drain electrode 175, and in at least one exemplary embodiment is a metal layer including aluminum.

The white reflective layer 80 is formed on the passivation layer 180q.

As described above, the auxiliary reflective layer 177 is formed below the white reflective layer 80, and even if the white reflective layer 80 is formed to have a thickness of about 2 μm or less, the reflectivity does not deteriorate.

Consequently, the white reflective layer 80 is formed to have a thin thickness of about 2 μm or less, so that the contact hole 185 can be easily formed in the white reflective layer 80.

Meanwhile, in the previous exemplary embodiment, the white reflective layer 80 is disposed below the transparent pixel electrode 190, and the auxiliary reflective layer 177 is formed below the white reflective layer 80. However, in the present exemplary embodiment the white reflective layer 80 may also be formed on the pixel electrode 190 which may be formed of an opaque metal layer.

Hereinafter, an eighth exemplary embodiment of a flat panel display including the pixel electrode 190 formed of an opaque metal layer and the white reflective layer 80 formed on the pixel electrode 190 will be described with reference to FIG. 9.

Figure 9:
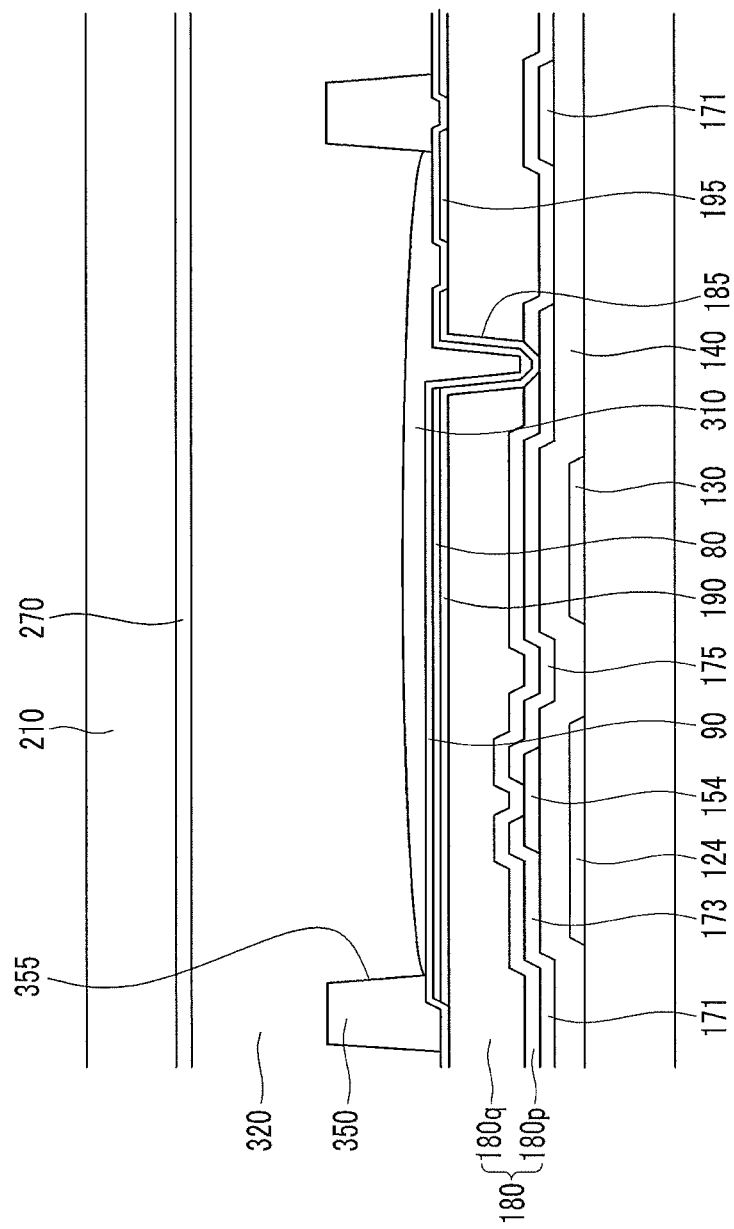
FIG. 9 is a cross-sectional view of an eighth exemplary embodiment of a flat panel display according to the present invention.

FIG. 9 is a cross-sectional view of the eighth exemplary embodiment of a flat panel display according to the present invention.

Since the eighth exemplary embodiment is substantially identical to the previous exemplary embodiment shown with respect to FIG. 8, except for the pixel electrode 190 formed of an opaque metal layer and the white reflective layer 80 formed on the pixel electrode 190, detailed description thereof will be omitted in order to avoid redundancy.

As shown in FIG. 9, in the eighth exemplary embodiment of a flat panel display according to the present invention, the auxiliary reflective layer 177 is not formed on the same layer as the source electrode 173 and the drain electrode 175.

Furthermore, the pixel electrode 190 which is formed of an opaque metal layer including aluminum is formed on the passivation layer 180q. The pixel electrode 190 is physically and electrically connected to the drain electrode 175 through the contact hole 185.

The white reflective layer 80 including $TiO_2$ and resin is formed on the pixel electrode 190. In another exemplary embodiment, the white reflective layer 80 may also include $BaSO_4$ and resin.

In one exemplary embodiment, the content of $TiO_2$ of the white reflective layer 80 is about 20 wt % to about 80 wt %, and the content of $BaSO_4$ of the white reflective layer 80 is about 20 wt % to about 80 wt %.

The hydrophobic insulating layer 90 is formed on the white reflective layer 80, and the barrier ribs 350 are formed on the hydrophobic insulating layer 90.

As described above, since the pixel electrode 190 which is formed of an opaque metal layer is formed under the white reflective layer 80, even if the white reflective layer 80 is formed to have a thickness d of about 2 μm or less, the reflectivity does not deteriorate.

Further, since the thickness of the white reflective layer 80 can be made significantly thinner, even if the white reflective layer 80 is formed on the pixel electrode 190, a voltage drop does not occur between the common electrode 270 and the pixel electrode 190.

As described above, the white reflective layer of the present exemplary embodiment is applied when the flat panel display is an electrowetting type of display. However, the white reflective layer of the present exemplary embodiment can also be applied to a reflective electrophoretic display.

Hereinafter, an exemplary embodiment of the reflective electrophoretic display to which the white reflective layer is applied will be described with reference to FIG. 10.

Figure 10:
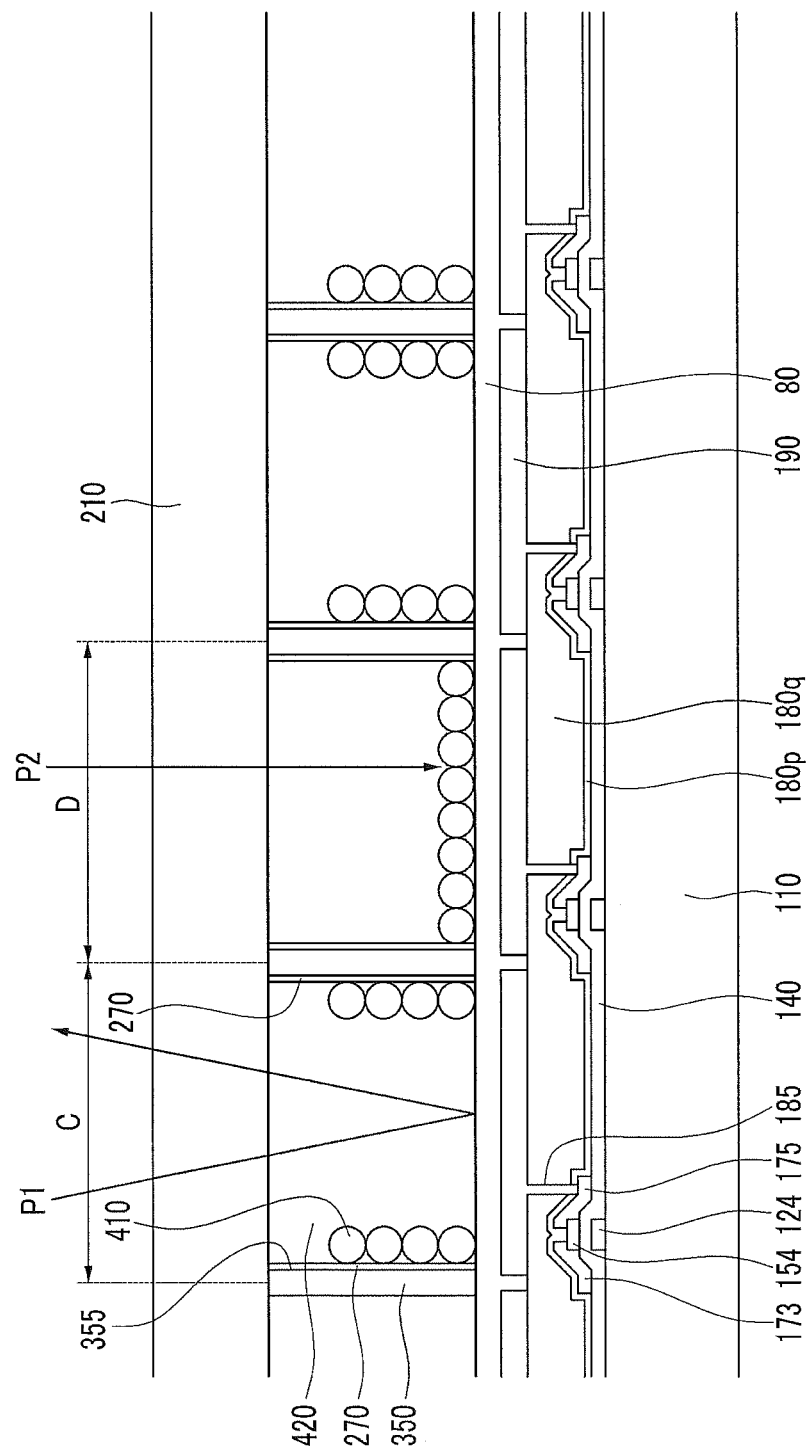
FIG. 10 is a cross-sectional view of a ninth exemplary embodiment of a flat panel display according to the present invention.

FIG. 10 is a cross-sectional view of a ninth exemplary embodiment of a flat panel display according to the present invention.

Since the ninth exemplary embodiment is substantially identical to the previous exemplary embodiment shown with respect to FIG. 10, except for positions of a plurality of charged particle "s" and a common electrode, detailed description thereof will be omitted in order to avoid redundancy.

As shown in FIG. 10, the ninth exemplary embodiment of a flat panel display according to the present invention, wherein the flat panel display is a reflective electrophoretic display, includes the lower substrate 110 on which the pixel electrode 190 and the common electrode 270 are formed, the upper substrate 210 facing the lower substrate 110, the barrier ribs 350 disposed between the lower substrate 110 and the upper substrate 210 and having a plurality of openings 355, and a plurality of charged particles 410 disposed in the opening 355.

The pixel electrode 190, which in the present exemplary embodiment is formed of an opaque metal layer including aluminum, is formed on the passivation layer 180q. The pixel electrode 190 is physically and electrically connected to the drain electrode 175 through the contact hole 185.

In the present exemplary embodiment, the white reflective layer 80 including $TiO_2$ and resin is formed on the pixel electrode 190. However, alternative exemplary embodiments of the white reflective layer 80 may also include $BaSO_4$ and resin.

In one exemplary embodiment, the content of the $TiO_2$ of the white reflective layer 80 is about 20 wt % to about 80 wt %, and the content of $BaSO_4$ of the white reflective layer 80 is about 20 wt % to about 80 wt %.

The barrier ribs 350 are formed on the white reflective layer 80. The barrier ribs 350 are formed in a matrix shape with openings to form a pixel, and are formed with organic layers including black pigment.

Inert gas 420 such as argon (Ar), neon (Ne), helium (He), and other materials with similar characteristics, is filled in the opening 355 together with the plurality of charged particles 410.

Alternative exemplary embodiments include configurations wherein instead of the inert gas, other gases (e.g., nitrogen or dried air) suitable for conserving charges of the charged particle s 410 may also be filled therein.

Further, the opening 355 may also be maintained in a vacuum state, and filled with at least one of liquid with no polarity or a small amount of polarity, solvent with a small amount of surface energy and liquid crystal.

The common electrode 270 is formed at a sidewall of the barrier ribs 350, and a horizontal electric field is formed between the pixel electrode 190 and the common electrode 270.

The charged particles 410 are positively or negatively charged opaque particles, and move toward the pixel electrode 190 or the common electrode 270 according to a polarity of a voltage applied between the pixel electrode 190 and the common electrode 270 and a polarity of the charged particles 410.

Thus, in the pixel D in which the white reflective layer 80 is covered with the charged particles 410 which have moved toward the pixel electrode 190, since light P2 incident into the opening 355 is absorbed by the opaque charged particles 410, the pixel D displays a black color.

However, in the pixel C in which the white reflective layer 80 is not covered with the charged particles 410 which have moved toward the common electrode 270, since light P1 incident into the opening 355 is reflected by the exposed white reflective layer 80, the pixel C displays a white color.

As described above, since the pixel electrode 190, which is made of an opaque metal layer, is formed under the white reflective layer 80, even if the white reflective layer 80 is formed to have a thickness d of about 2 μm or less, the reflectivity does not deteriorate.

Further, since the thickness of the white reflective layer 80 can be made to be relatively thin, even if the white reflective layer 80 is formed on the pixel electrode 190, a voltage drop does not occur between the common electrode 270 and the pixel electrode 190.

In addition, the auxiliary reflective layer 177 is further formed below the white reflective layer 80 of the flat panel display according to the present exemplary embodiment, so that the thickness of the white reflective layer 80 can be reduced.

Hereinafter, the structure of a tenth exemplary embodiment of a flat panel display in which the auxiliary reflective layer 177 is further formed below the white reflective layer 80 of the flat panel display according to the present invention will be described with reference to FIG. 11.

Figure 11:
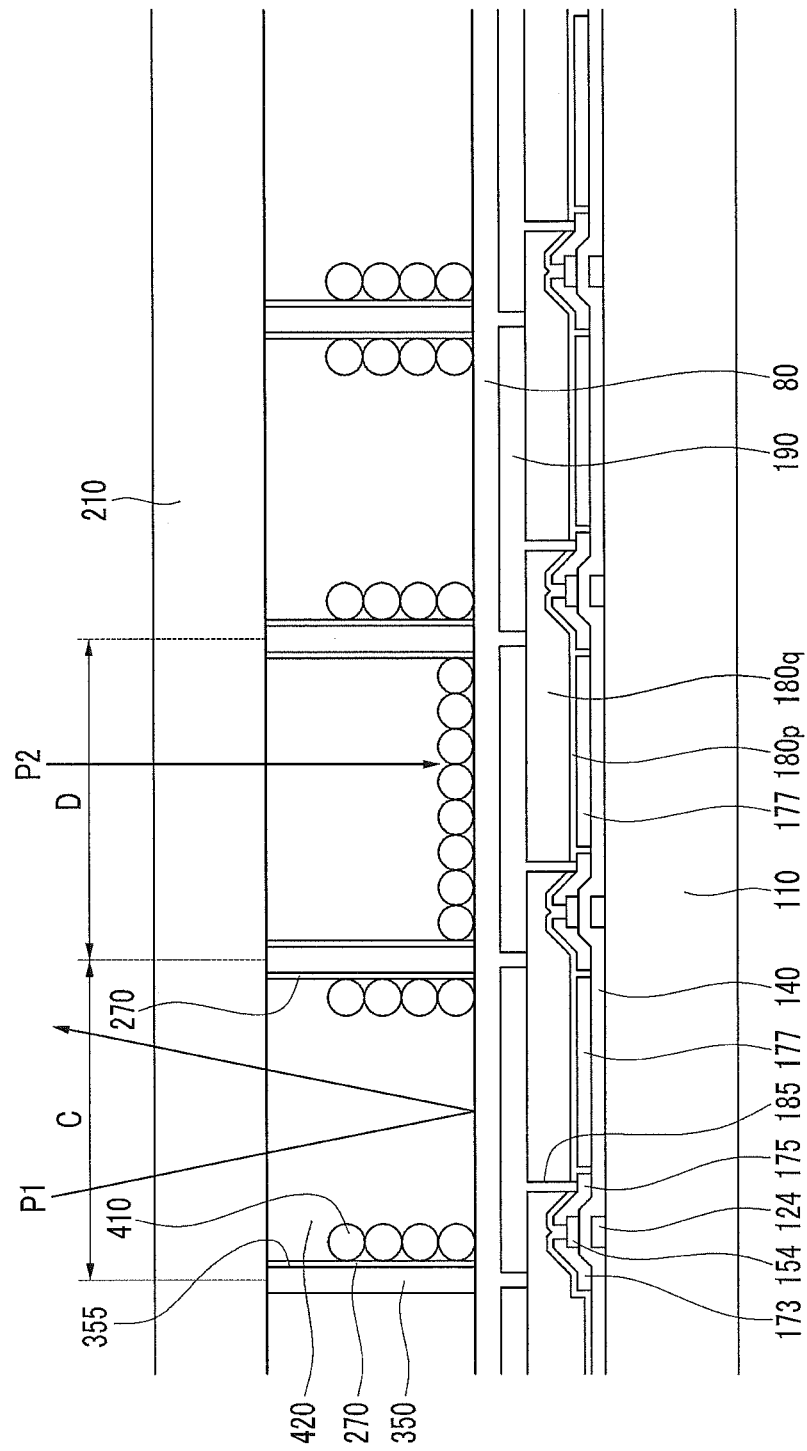
FIG. 11 is a cross-sectional view of a tenth exemplary embodiment of a flat panel display according to the present invention.

FIG. 11 is a cross-sectional view of the tenth exemplary embodiment of a flat panel display according to the present invention.

Since the tenth exemplary embodiment is substantially identical to the previous exemplary embodiment shown with respect to FIG. 10, except for the structure in which the auxiliary reflective layer 177 is further formed below the white reflective layer 80, detailed description thereof will be omitted in order to avoid redundancy.

As shown in FIG. 11, in the tenth exemplary embodiment of a flat panel display according to the present invention, the auxiliary reflective layer 177 is formed on the same layer as the source electrode 173 and the drain electrode 175.

The auxiliary reflective layer 177 may be made of the same material as the source electrode 173 and the drain electrode 175, and in at least one exemplary embodiment is a metal layer including aluminum.

The white reflective layer 80 is formed on the passivation layer 180q and the pixel electrode 190.

As described above, since the auxiliary reflective layer 177 is formed below the white reflective layer 80, even if the white reflective layer 80 is formed to have a thickness of about 2 μm or less, the reflectivity thereof does not deteriorate.

Consequently, the white reflective layer 80 is formed to have a thin thickness of about 2 μm or less, so that the contact hole 185 can be easily formed in the white reflective layer 80.

In the ninth and tenth exemplary embodiments, the white reflective layer is applied when the flat panel display is an electrophoretic display. However, the white reflective layer of the present exemplary embodiment can be applied to a reflective bi-stable liquid crystal display as described in further detail below.

Hereinafter, an eleventh exemplary embodiment of the reflective bi-stable liquid crystal display to which the white reflective layer of the present exemplary embodiment is applied will be described with reference to FIG. 12.

Figure 12:
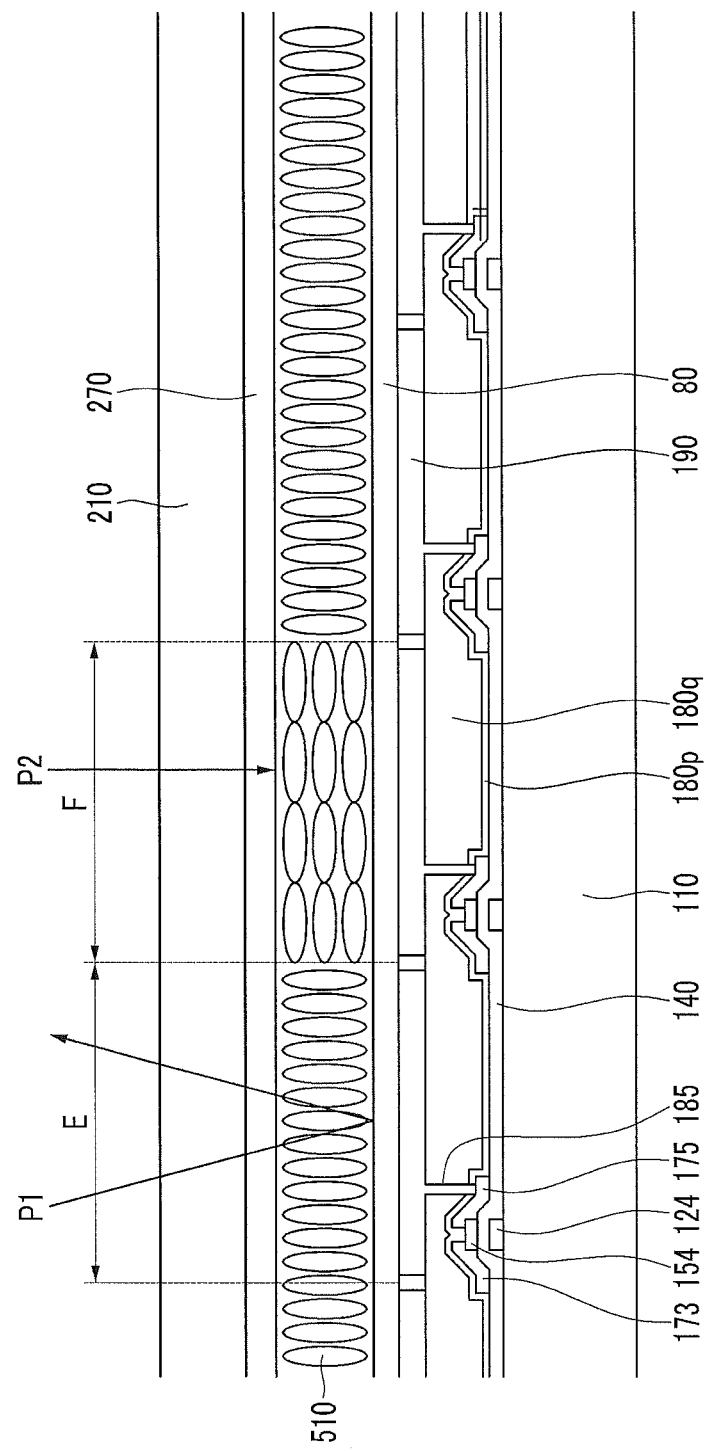
FIG. 12 is a cross-sectional view of an eleventh exemplary embodiment of a flat panel display according to the present invention.

FIG. 12 is a cross-sectional view of the eleventh exemplary embodiment of a flat panel display according to the present invention.

Since the eleventh exemplary embodiment is substantially identical to the exemplary embodiment shown with respect to FIG. 12, except for positions of a bi-stable liquid crystal layer and a common electrode, detailed description thereof will be omitted in order to avoid redundancy.

As shown in FIG. 12, the eleventh exemplary embodiment of a flat panel display according to the present invention is a bi-stable liquid crystal layer and includes the lower substrate 110 on which the pixel electrode 190 is formed, the upper substrate 210 facing the lower substrate 110 and on which the common electrode 270 is formed, and a bi-stable liquid crystal layer 510 disposed between the lower substrate 110 and the upper substrate 210.

The pixel electrode 190, which is formed of an opaque metal layer including aluminum, is formed on the passivation layer 180q. The pixel electrode 190 is physically and electrically connected to the drain electrode 175 through the contact hole 185. In the present exemplary embodiment, the white reflective layer 80 including TiO$_2$ and resin is formed on the pixel electrode 190. In another exemplary embodiment, the white reflective layer 80 may also include BaSO$_4$ and resin.

In one exemplary embodiment, the content of the TiO$_2$ of the white reflective layer 80 is about 20 wt % to about 80 wt %, and the content of BaSO$_4$ of the white reflective layer 80 is about 20 wt % to about 80 wt %.

The bi-stable liquid crystal layer 510 is formed between the white reflective layer 80 and the common electrode 270. The bi-stable liquid crystal layer 510 can be aligned in two stable directions according to a voltage applied between the pixel electrode 190 and the common electrode 270.

Thus, in a pixel F in which the liquid crystals of the bi-stable liquid crystal layer 510 are horizontally aligned between both substrates 110 and 210 according to the applied voltage, light P2 incident into the bi-stable liquid crystal layer 510 is absorbed by the liquid crystals of the bi-stable liquid crystal layer 510, the pixel F displays a black color.

However, in a pixel E in which the liquid crystals of the bi-stable liquid crystal layer 510 are vertically aligned between the both substrates 110 and 210 according to the applied voltage, light P1 incident into the bi-stable liquid crystal layer 510 is reflected by the white reflective layer 80 after passing through the liquid crystals of the bi-stable liquid crystal layer 510, the pixel E displays a white color.

As described above, since the pixel electrode 190, which is made of an opaque metal layer, is formed under the white reflective layer 80, even if the white reflective layer 80 is formed to have a thickness d of about 2 μm or less, the reflectivity does not deteriorate.

Further, since the thickness of the white reflective layer 80 can be reduced, even if the white reflective layer 80 is formed on the pixel electrode 190, a voltage drop does not occur between the common electrode 270 and the pixel electrode 190.

In addition, according to the present exemplary embodiment, the auxiliary reflective layer 177 is further formed below the white reflective layer 80 of the flat panel display, so that the thickness of the white reflective layer 80 can be further reduced.

Hereinafter, a twelfth exemplary embodiment of a structure in which the auxiliary reflective layer 177 is further formed below the white reflective layer 80 of the flat panel display according to the present invention will be described with reference to FIG. 13.

Figure 13:
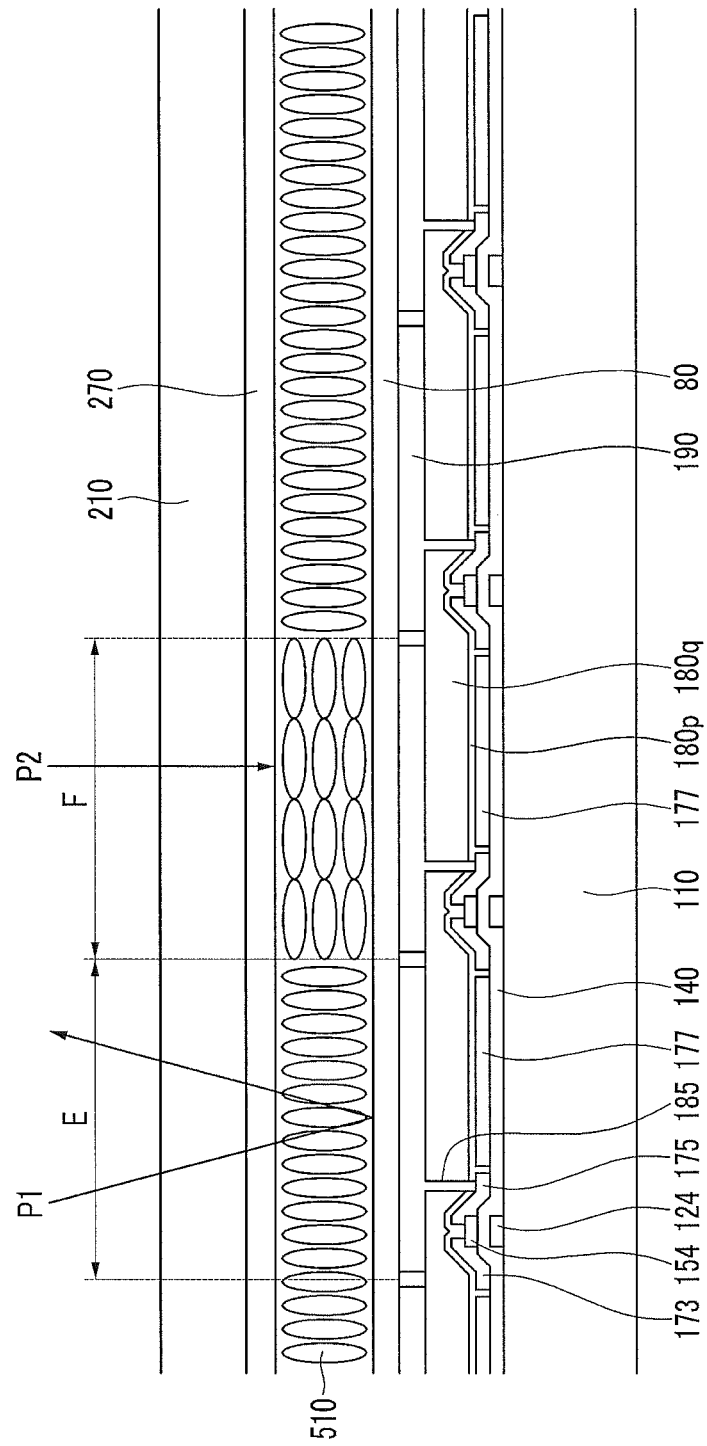
FIG. 13 is a cross-sectional view of a twelfth exemplary embodiment of a flat panel display according to the present invention.

FIG. 13 is a cross-sectional view of the twelfth exemplary embodiment of a flat panel display according to the present invention.

Since the twelfth exemplary embodiment is substantially identical to the previous exemplary embodiment shown with respect to FIG. 12, except for the structure in which the auxiliary reflective layer 177 is further formed below the white reflective layer 80, detailed description thereof will be omitted in order to avoid redundancy.

As shown in FIG. 13, in the twelfth exemplary embodiment of a flat panel display according to the present invention, the auxiliary reflective layer 177 is formed on the same layer as the source electrode 173 and the drain electrode 175. Such an auxiliary reflective layer 177 may be made of the same material as the source electrode 173 and the drain electrode 175, and in one exemplary embodiment is a metal layer including aluminum.

The white reflective layer 80 is formed on the pixel electrode 190.

As described above, since the auxiliary reflective layer 177 is formed below the white reflective layer 80, even if the white reflective layer 80 is formed to have a thickness of about 2 μm or less, the reflectivity does not deteriorate.

Consequently, the white reflective layer 80 is formed to have a thin thickness of about 2 μm or less, so that the contact hole 185 can be easily formed in the white reflective layer 80.

Hereinafter, a thirteenth exemplary embodiment of a flat panel display according to the present invention will be described with reference to the accompanying drawings.

Figure 14:
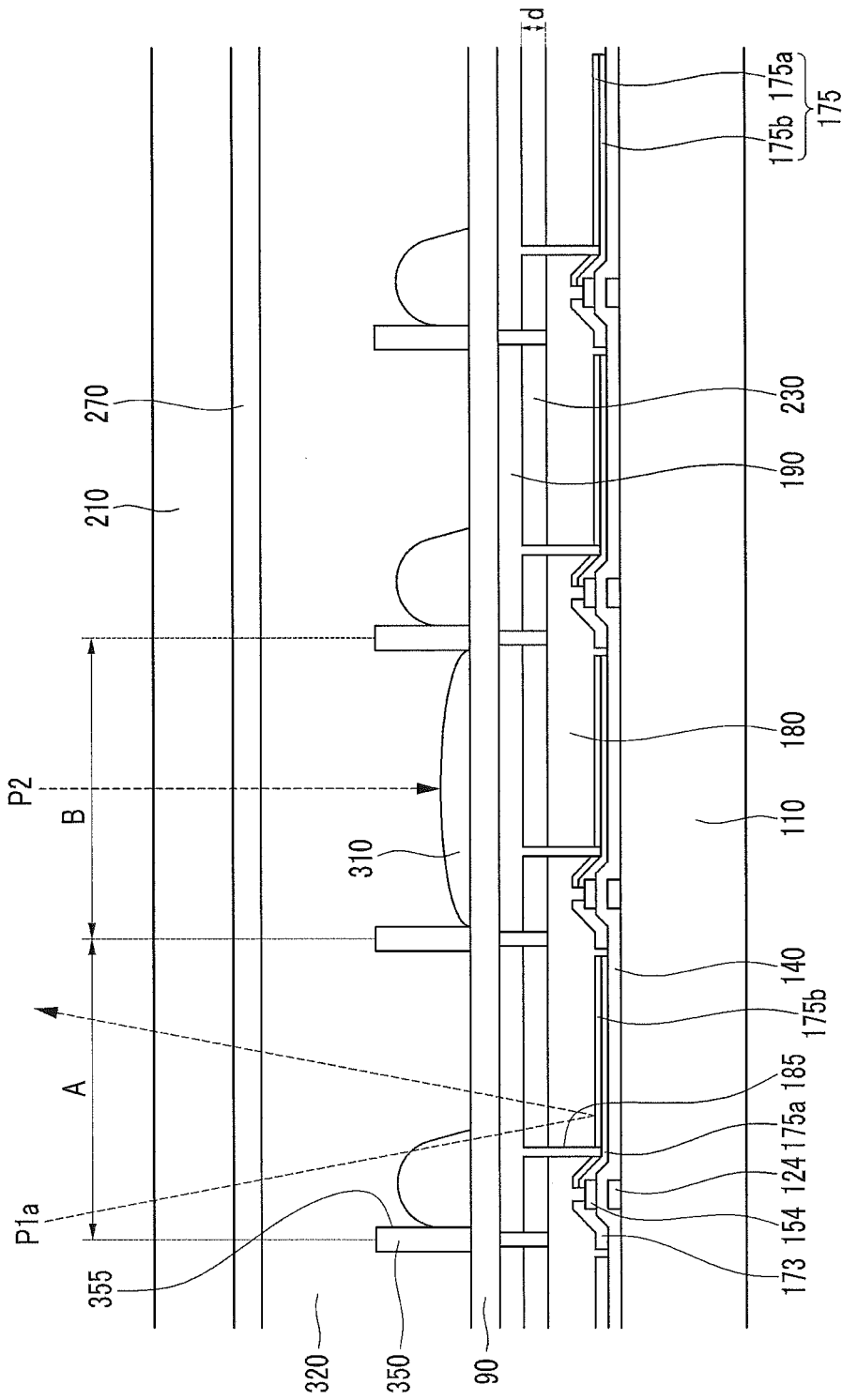
FIG. 14 is a cross-sectional view of a thirteenth exemplary embodiment of a flat panel display according to the present invention.

FIG. 14 is a cross-sectional view of the thirteenth exemplary embodiment of a flat panel display according to the present invention.

As shown in FIG. 14, the thirteenth exemplary embodiment of a flat panel display according to the present invention is a reflective electrowetting display, which includes a lower substrate 110 on which a pixel electrode 190 is formed, an upper substrate 210 opposite to the lower substrate 110 and formed with a common electrode 270, and electrooptic layers 310 and 350 disposed between the lower substrate 110 and the upper substrate 210, wherein the electrooptic layers 310 and 350 includes a barrier rib 350 having a plurality of opening 355 and a black oil layer 310 disposed in the opening 355.

The lower substrate 110 and the upper substrate 210 may be a glass substrate, a flexible substrate made of plastic, glass fiber reinforced plastic ("FRP"), or other materials with similar characteristics. The lower substrate 110 forms a pixel domain (PD) by crossing a gate line (not shown) with a data line (not shown), wherein the pixel domain (PD) includes a thin film transistor domain (TD) and a display domain (DD); the pixel domain (PD) is not necessarily bounded by the intersection of the gate line and the data line. The TFT domain (TD) is a domain in which the TFT is formed at the intersection of the gate line and the data line and the display domain (DD) is a portion of the pixel domain (PD) which excludes the TFT domain (TD).

The gate electrode 124 connected to a plurality of gate lines mainly extending in a horizontal direction is formed on the lower substrate 110. The gate insulating layer 140, which may be made of SiNx, or other materials with similar characteristics, is formed on the gate line and the gate electrode 124.

A semiconductor layer 154 made of hydrogenated amorphous silicon, or other materials with similar characteristics, is formed on the gate insulating layer 140. The semiconductor layer 154 forms the channel of the TFT. The data line and the drain electrode 175 are formed on the gate insulating layer 140 and the semiconductor layer 154. The data line intersects with the gate line to mainly extend in a vertical direction and a branch extending from each data line forms a source electrode 173. The source electrode 173 and the drain electrode 175 formed in a pair are each disposed on at least a part of the semiconductor layer 154, and are isolated from each other, and are disposed at an opposite side with respect to the gate electrode 124.

The drain electrode 175 is formed in the TFT domain (TD) and display domain (DD) to overlap with the pixel electrode 190. That is, the drain electrode 175 is formed to extend to the display domain (DD) as well as the TFT domain (TD), thereby making it possible to reflect light incident on the pixel electrode 190. In one exemplary embodiment, the drain electrode 175 includes a lower drain electrode 175*a* and an upper drain electrode 175*b*. In such an exemplary embodiment, the lower drain electrode 175*a* may be made of a conductive material, such as metal, exemplary embodiments of which may include molybdenum, titanium, and other materials with similar characteristics. The upper drain electrode 175*b* may be made of a highly reflectivity material, such as metal, for example, aluminum, and other materials with similar characteristics. Light incident to the exemplary embodiment of a reflective electrowetting display according to the present invention from the outside may be effectively reflected by the upper drain electrode 175*b* made of a metal with a high reflectivity.

In this case, since the data line, the source electrode 173, and the drain electrode 175 are formed on the same layer, the data line, the source electrode 173 as well as the drain electrode 175, may be made in a double layer, e.g., they each may have a double layered structure.

In addition, the pixel electrode 190 is formed to extend to the upper portions of the source electrode 173 as well as the drain electrode 175, the source electrode 173 is formed in a double layer, and the upper layer is made of a metal having a high reflectivity, such that light incident from the outside may be effectively reflected even in the TFT domain (TD).

An ohmic contact is disposed between the semiconductor layer 154 and the source electrode 173 and the drain electrode 175, thereby making it possible to lower contact resistance therebetween.

A passivation layer 180, exemplary embodiments of which may be made of an insulating material such as silicon oxide, silicon nitride, and other materials with similar characteristics, is formed to cover a part of the exposed semiconductor layer 154, and is formed on the source electrode 173, the drain electrode 175, the semiconductor layer 154, and the gate insulating layer 140.

A color filter 230 may be formed on the passivation layer 180. In one exemplary embodiment, the color filter 230 may be formed of a quantum dot (e.g., semiconductor nanocrystal). Since the quantum dot, which is a semiconductor material having a crystal structure having a size of only several nanometers in any dimension, is formed to have several hundred to several thousand of atoms and has a very small size, it has a wide surface domain per unit volume and exhibits a quantum confinement effect. Therefore, it exhibits unique physicochemical properties different from unique properties of a semiconductor material. Various synthesizing technologies have been developed through controlling the size, structure, and uniformity of the quantum dots having excellent characteristics and various applications The pixel electrode 190 made of a transparent conductive material, exemplary embodiments of which include ITO, IZO, and other materials with similar characteristics, is formed on the color filter 230.

The contact holes 185 are formed on the color filter 230, the passivation layer 180, and the upper drain electrode 175b to expose the lower drain electrode 175a. The pixel electrode 190 is physically and electrically connected to the lower drain electrode 175a through the contact holes 185.

During the etching process for forming the contact holes 185, the thickness of the lower drain electrode 175a may be formed to be sufficiently thicker than in the case of performing etching to penetrate through the upper drain electrode 175b and reaching the lower drain electrode 175a.

The hydrophobic insulating layer 90 is formed on the pixel electrode 190 and the barrier rib 350 is formed on the hydrophobic insulating layer 90. The barrier rib 350 is formed in a matrix form having the opening 355 to form a pixel and is formed of an organic layer containing black pigment. The black oil layer 310 is formed in the opening 355. The aqueous solution layer 320 is formed between the barrier rib 350 and the black oil layer 310 and the common electrode 270.

Since the surface tension of the aqueous liquid layer 320 is not changed in pixel B where voltage is not applied between the pixel electrode 190 and the common electrode 270, the black oil layer 310 covers the entire corresponding pixel B. Therefore, the light P2 incident to the opening is absorbed in the black oil layer 310 before reaching the upper drain electrode 175b, such that the pixel B displays black.

On the other hand, the surface tension of the aqueous liquid layer 320 is changed in the pixel A in which voltage is applied between the pixel electrode 190 and the common electrode 270, such that the black oil layer 310 may be compressed to open the corresponding pixel A. Therefore, light P1a incident to the opening is reflected from the upper drain electrode 175b and the pixel A displays colors according to the color of the color filter 230.

Exemplary embodiments include configurations wherein the color filter 230 may be omitted and wherein the flat panel display device according to exemplary embodiment of the present invention does not include the color filter 230, the pixel A displays white and thus, may be used as a monochromatic display device.

Hereinafter, a fourteenth exemplary embodiment of a flat panel display according to the present invention will be described in detail with reference to the accompanying drawings.

Figure 15:
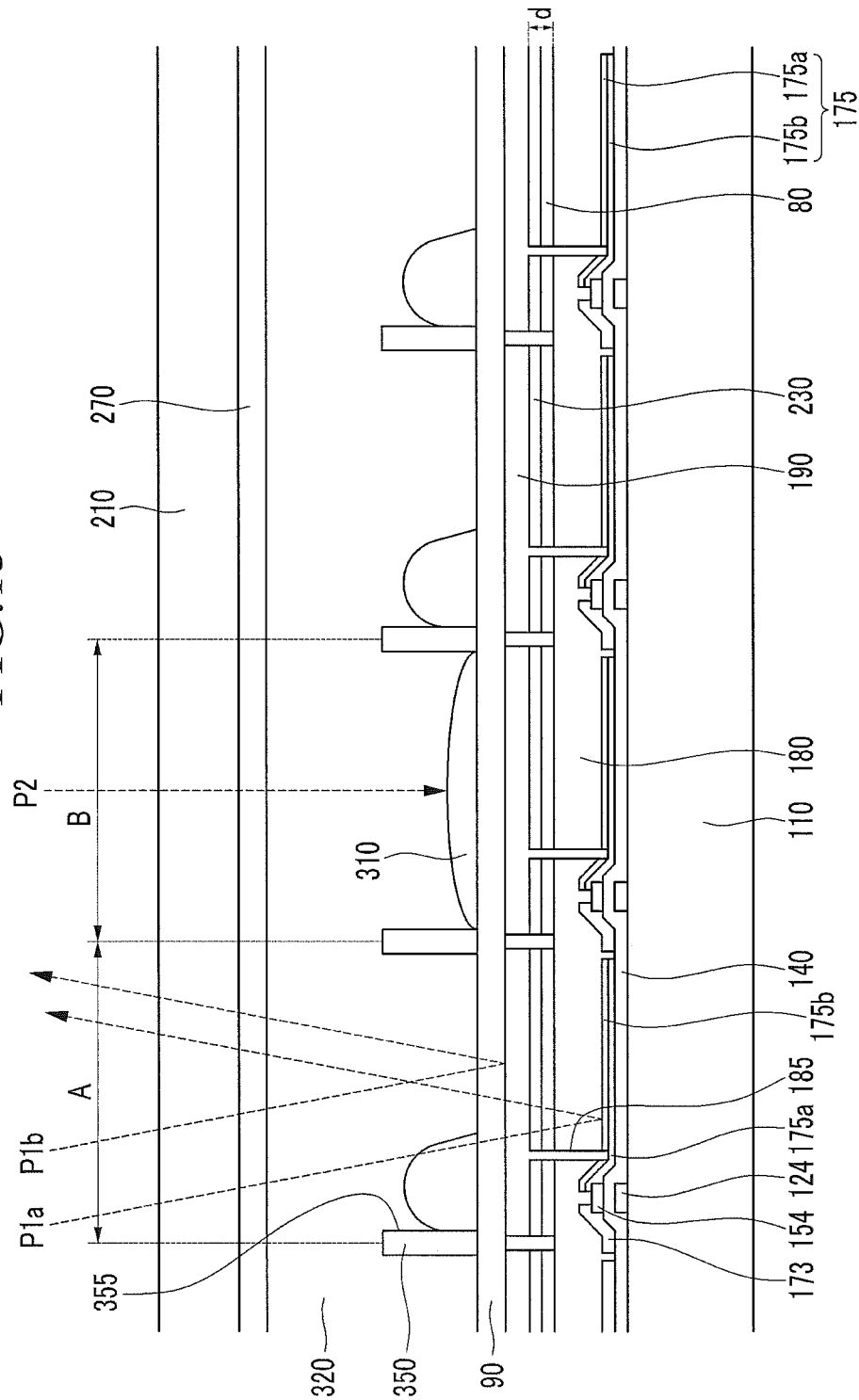
FIG. 15 is a cross-sectional view of a fourteenth exemplary embodiment of a flat panel display according to the present invention.

FIG. 15 is a cross-sectional view of the fourteenth exemplary embodiment of a flat panel display according to the present invention.

The fourteenth exemplary embodiment is substantially the same as the thirteenth exemplary embodiment other than that it further includes the white reflective layer 80 and therefore, the description of the same components will not be repeated.

As shown in FIG. 15, the fourteenth exemplary embodiment of a flat panel display according to the present invention includes a white reflective layer between a passivation layer 180 and a pixel electrode 190. The white reflective layer 80 may be made of $TiO_2$ and resin and may also, or alternatively, be made of $BaSO_4$ and resin. In one exemplary embodiment, the content of the $TiO_2$ of the white reflective layer 80 is about 20 wt % to about 80 wt % or the content of $BaSO_4$ of the white reflective layer 80 is about 20 wt % to about 80 wt %.

When the content of the $TiO_2$ or the $BaSO_4$ is less than about 20 wt %, the reflectivity is degraded and when the content of the $TiO_2$ or the $BaSO_4$ is more than about 80 wt %, it is difficult to perform the patterning.

Since the auxiliary reflective layer 177 is formed below the white reflective layer 80, the reflectivity is not degraded even though the thickness d of the white reflective layer 80 is formed at about 2 μm or less. Therefore, it may be easy to form the contact holes 185 on the white reflective layer 80 by thinly forming the thickness of the white reflective layer 80 at about 2 μm or less.

Hereinafter, a fifteenth exemplary embodiment of a flat panel display according to the present invention will be described in detail with reference to the accompanying drawings.

Figure 16:
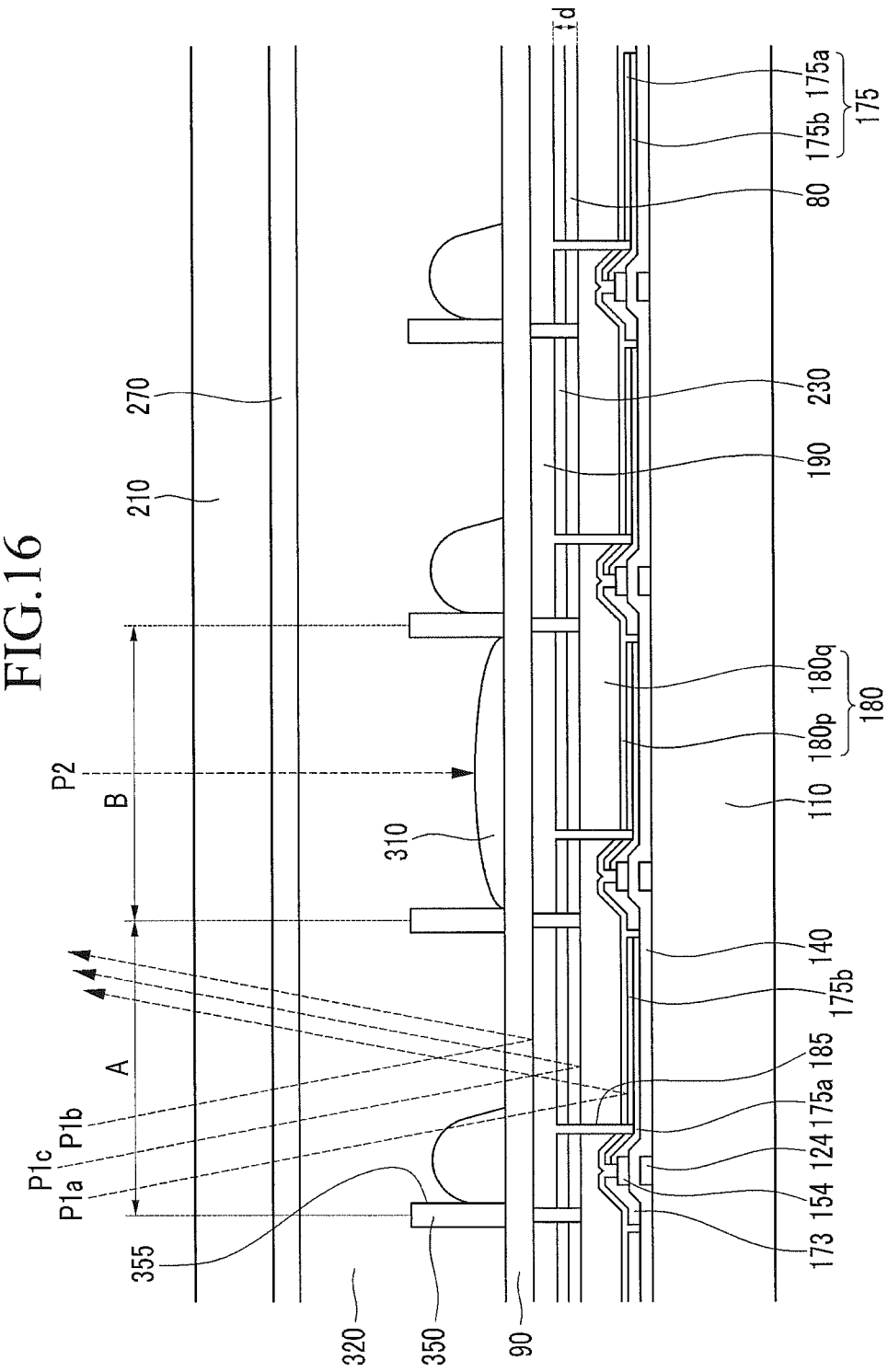
FIG. 16 is a cross-sectional view of a fifteenth exemplary embodiment of a flat panel display according to the present invention.

FIG. 16 is a cross-sectional view of the fifteenth exemplary embodiment of a flat panel display according to the present invention.

The fifteenth exemplary embodiment is substantially the same as the fourteenth exemplary embodiment other than the passivation layer 180 is configured to include a lower passivation layer 180p and an upper passivation layer 180q and therefore the description of the same components will not be repeated.

As shown in FIG. 16, in the fifteenth exemplarily embodiment of a flat panel display according to the present invention, the passivation layer 180 includes a lower passivation layer 180p and an upper passivation layer 180q.

The lower passivation layer 180p is made of an inorganic insulating material such as silicon oxide, silicon nitride, and other materials with similar characteristics, covering a part of the semiconductor layer 154 exposed on the source electrode 173, the drain electrode 175, the semiconductor 154, and the gate insulating layer 140.

The upper passivation layer 180q is formed on the lower passivation layer 180p and is made of an organic insulating material having excellent planarization characteristics.

Hereinafter, the influence on reflectivity will be described with reference to Table 2 when the upper passivation layer 180q made of an organic insulation material is further formed on the lower passivation layer 180p.

Table 2 represents the reflectivity of the case where the organic layer is present and the case where the organic layer is not present.

TABLE 2

| | | Case where organic layer is not present | Case where organic layer is present |
|---|---|---|---|
| Upper drain electrode (175b) | | Aluminum 0.1 μm | Aluminum 0.1 μm |
| Passivation layer (180) | Lower passivation layer (180p) | Silicon nitride Nitride 0.2 μm | Silicon nitride 0.2 μm |
| | Upper passivation layer (180q) | | Organic insulating material 2 μm |
| White reflective layer (80) | | 3 μm | 3 μm |
| Reflectivity | | 65-66 | 68-70 |

As in the fourteenth exemplary embodiment, the reflectivity of the exemplary embodiment where the single-layer passivation layer using the inorganic insulating material is formed was measured as 65-66, while as in the fifteenth exemplary embodiment, the reflectivity of the exemplary embodiment where the passivation layer using the organic insulating material is further formed was measured as 68-70. In other words, it is apparent from Table 2 that the reflectivity may be further improved by further forming the passivation layer using the organic insulating material.

In the thirteenth exemplary embodiment of a flat panel display according to the present invention, the drain electrode 175 is configured to include the lower drain electrode 175a and the upper drain electrode 175b. The upper drain electrode 175b is made of a reflective material such as aluminum, thereby improving the reflectivity thereof.

Thereafter, in the fourteenth exemplary embodiment of a flat panel display according to the present invention, the white reflective layer 80 including $TiO_2$ or $BaSO_4$ is further formed, thereby making it possible to further improve the reflectivity of the upper drain electrode 175b and the white reflective layer 80.

Furthermore, in the fifteenth exemplary embodiment of a flat panel display according to the present invention, the passivation layer 180 is configured to include the lower passivation layer 180a and the upper passivation layer 180b. In the present exemplary embodiment, the lower passivation layer 180a is made of the inorganic insulating material and the upper passivation layer 180b is made of the organic insulating material, thereby making it possible to further improve the reflectivity by the upper drain electrode 175b, the white reflective layer 80, and the upper passivation layer 180b.

Unlike the flat panel display according to the fifteenth exemplary embodiment of the present invention, in the present exemplary embodiment, the white reflective layer 80 may be omitted. Therefore, the reflection is generated by the upper drain electrode 175b and the upper passivation layer 180b.

Hereinafter, an exemplary embodiment of a method for manufacturing an exemplary embodiment of a flat panel display according to the present invention will be described in detail with reference to the accompanying drawings.

FIGS. 17A to 17E are process plan views of an exemplary embodiment of a method for manufacturing an exemplary embodiment of a flat panel display according to the present invention.

Figure 17A:
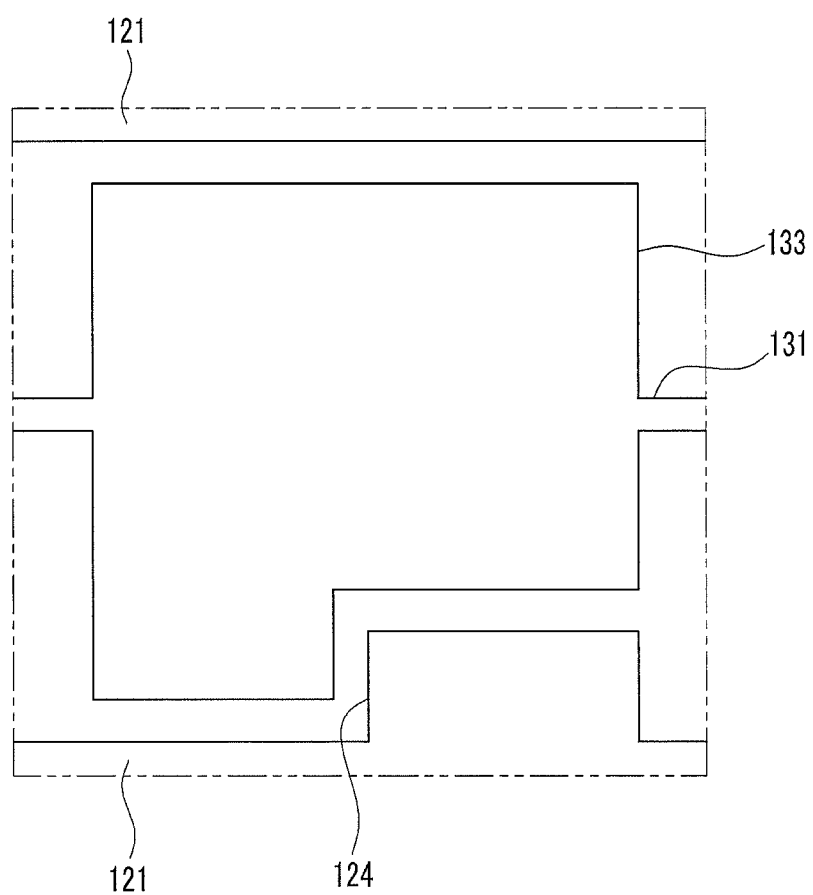
FIGS. 17A to 17E are process plan views of an exemplary embodiment of a method for manufacturing an exemplary embodiment of a flat panel display according to the present invention.

First, as shown in FIG. 17A, the conductive material is deposited and patterned on the substrate (not shown) to form the gate line 121 extending in one direction and the gate electrode 124 protruded from the gate line 121. At the same time, the sustain electrode line 131 which extends substantially parallel with the gate line 121 and the sustain electrode 133 which protrudes from the sustain electrode line 131 are formed.

Figure 17B:
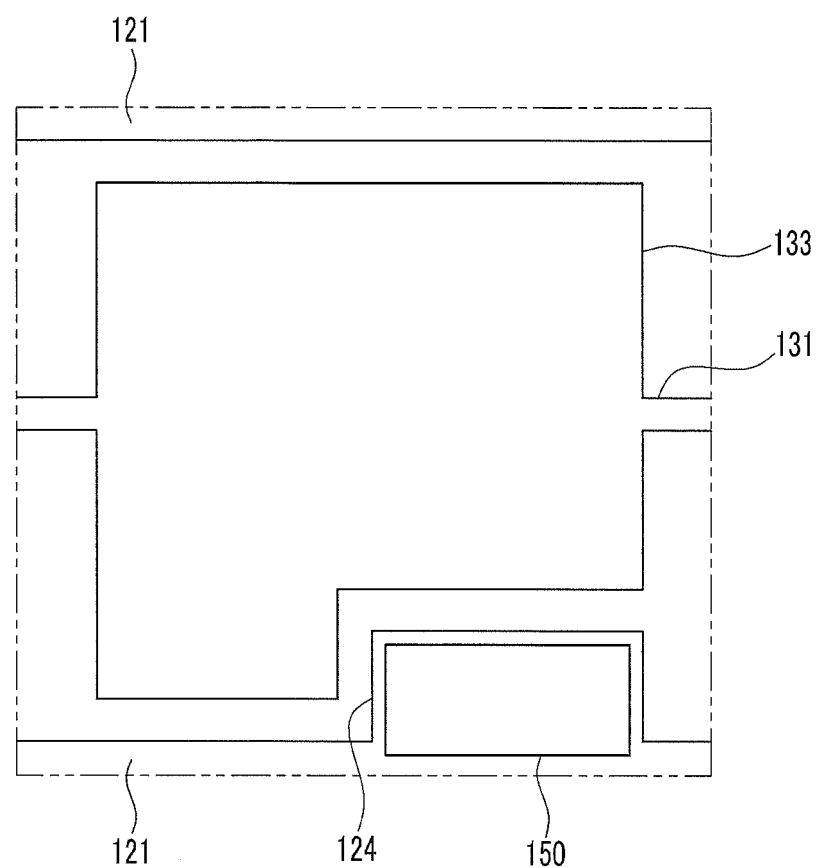

As shown in FIG. 17B, the gate insulating layer 140 made of the insulating material, such as silicon oxide, silicon nitride, and other materials with similar characteristics, is formed over the substrate including the gate line 121, the gate electrode 124, the sustain electrode line 131, and the sustain electrode 134.

Thereafter, the semiconductor layer 150 is formed on the gate insulating layer 140 to overlap with the gate electrode 124.

Figure 17C:
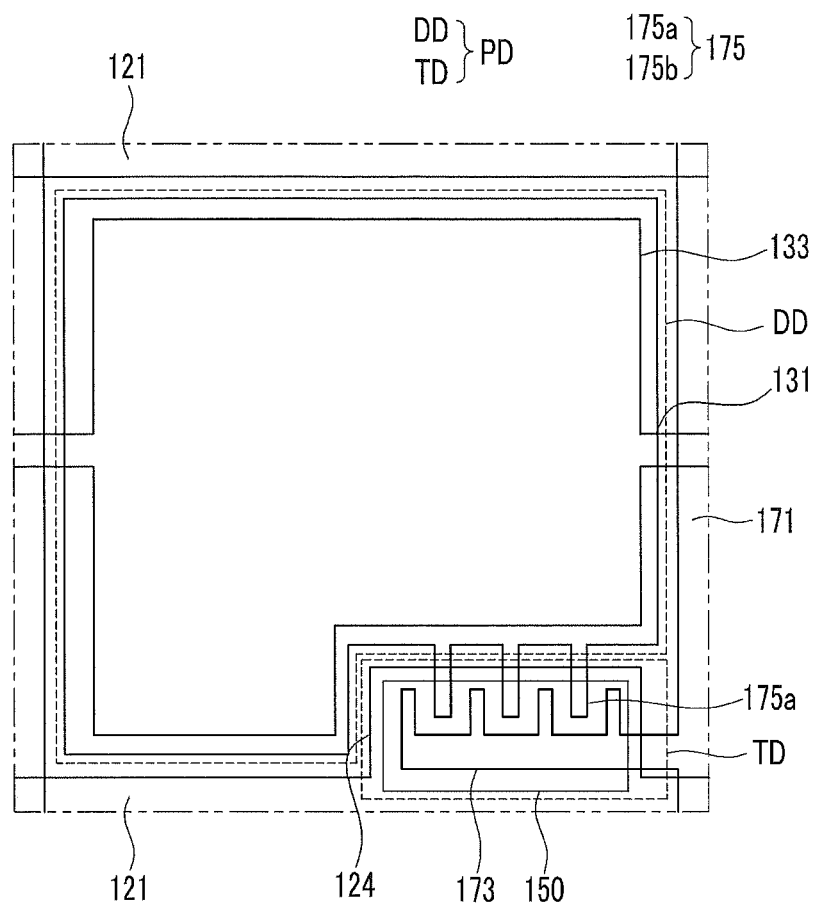

As shown in FIG. 17C, a conductive material such as molybdenum, titanium, or other materials with similar characteristics, and a material having high reflectivity such as aluminum, or other materials with similar characteristics, are stacked and patterned on the gate insulating layer 140 and the semiconductor layer 150 to form the data line 171 crossing with the gate line 121, the source electrode 173 protruded upwardly the semiconductor layer 150 from the data line 171, and the drain electrode 175 spaced apart from the source electrode 173.

The data line 171, the source electrode 173, and the drain electrode 175 are formed in a double layer by stacking and patterning two materials.

The pixel domain (PD) is formed by crossing the gate line 121 and the data line 171 with each other and the pixel domain PD includes the TFT domain (TD) and the display domain (DD). The drain electrode 175 is formed in both the TFT domain (TD) and the display domain (DD).

The passivation layer (not shown) is formed over the substrate including the data line 171, the source electrode 173, and the drain electrode 175 by stacking the inorganic insulating material and the organic insulating material on one another.

A material including $TiO_2$ and resin or a material including $BaSO_4$ and resin is applied on the passivation layer to form the white reflective layer (not shown). The color filter (not shown) is formed on the white reflective layer. In such an exemplary embodiment, the color filter may be formed of the quantum dot. Alternative exemplary embodiments include configurations wherein the color filter is omitted.

Figure 17D:
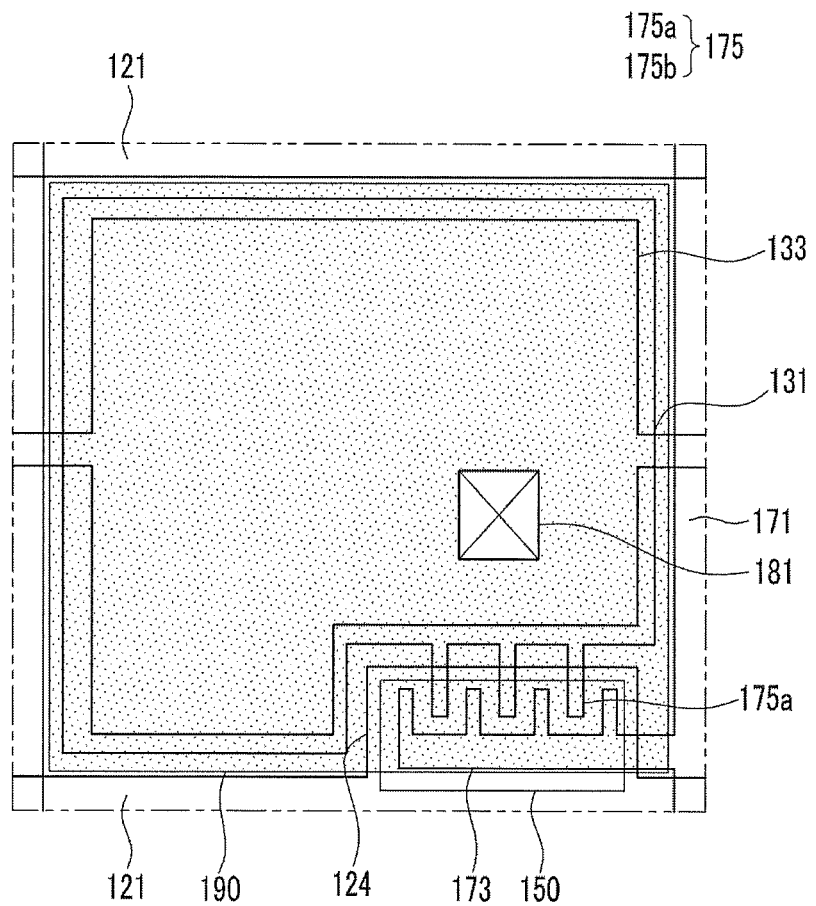

As shown in FIG. 17D, the contract hole 181 is formed by patterning the passivation layer, the white reflective layer, and the color filter, which are stacked on one another.

Then, the pixel electrode 190 connected to the drain electrode 175 through the contact hole 181 is formed by depositing and patterning the ITO, or IZO over the substrate.

Figure 17E:
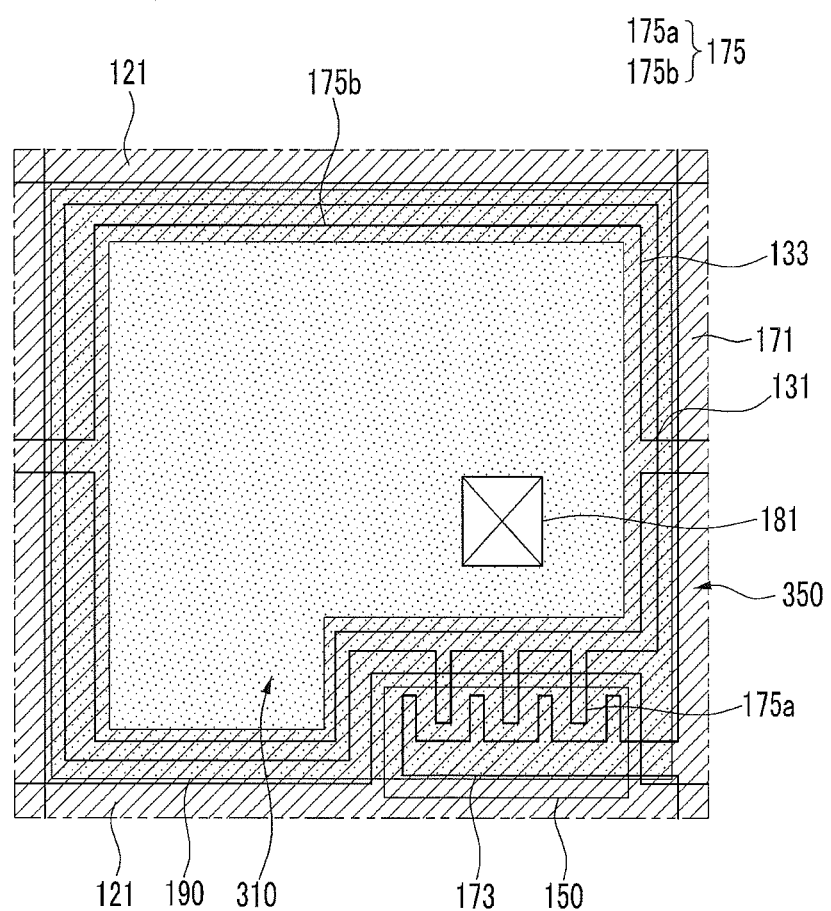

As shown in FIG. 17E, the barrier rib 350 is formed to enclose the outside of the pixel domain and the inside of the barrier rib 350, that is, the pixel domain is formed with the black oil layer 310. The barrier rib 350 is formed in a matrix form having the opening exposing the pixel domain and is formed as the organic layer containing the black pigment.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A flat panel display, comprising:
   a first substrate on which a plurality of pixel domains is defined, each of the plurality of pixel domains comprising a thin film transistor domain and a display domain;
   a gate line and a gate electrode disposed on the first substrate;
   at least one gate insulating layer disposed on the gate line and the gate electrode;
   a semiconductor layer disposed on the gate insulating layer;
   a data line which crosses the gate line;
   a source electrode electrically connected to the data line
   a drain electrode disposed substantially opposite to the source electrode with respect to the semiconductor layer;
   a passivation layer disposed on the data line, the source electrode, and the drain electrode;
   a pixel electrode disposed on the passivation layer and connected to the drain electrode;
   a second substrate disposed substantially opposite to the first substrate;
   a common electrode disposed on the second substrate; and
   an electrooptic layer disposed between the pixel electrode and the common electrode,
   wherein the drain electrode overlaps with the pixel electrode in the thin film transistor domain and the display domain and the drain electrode comprises an upper drain electrode and a lower drain electrode and the upper drain electrode is reflective.

2. The flat panel display of claim 1, wherein the electrooptic layer comprises:
- a hydrophobic insulating layer disposed on the pixel electrode;
- a barrier rib disposed on the hydrophobic insulating layer and having an opening formed therein; and
- a black oil layer disposed in the opening.

3. The flat panel display of claim 1, wherein the upper drain electrode is made of metal comprising aluminum.

4. The flat panel display of claim 3, wherein the lower drain electrode is made of metal comprising at least one of molybdenum and titanium.

5. The flat panel display of claim 1, further comprising contact holes formed in the passivation layer and the upper drain electrode which expose the lower drain electrode,
- wherein the pixel electrode is connected to the lower drain electrode through the contact holes.

6. The flat panel display of claim 1, wherein the passivation layer includes a lower passivation layer and an upper passivation layer,
- the lower passivation layer comprises an inorganic insulating material, and
- the upper passivation layer comprises an organic insulating material.

7. The flat panel display of claim 1, further comprising a color filter disposed between the passivation layer and the pixel electrode.

8. The flat panel display of claim 1, wherein the color filter comprises a quantum dot.

9. A flat panel display, comprising:
- a first substrate on which a plurality of pixel domains is defined, each of the plurality of pixel domains including a thin film transistor domain and a display domain;
- a gate line and a gate electrode disposed on the first substrate;
- a gate insulating layer disposed on the gate line and the gate electrode;
- a semiconductor layer disposed on the gate insulating layer;
- a data line which crosses the gate line;
- a source electrode electrically connected with the data line;
- a drain electrode disposed substantially opposite to the source electrode with respect to the semiconductor layer;
  - a passivation layer disposed on the data line, the source electrode, and the drain electrode;
  - a white reflective layer disposed on the passivation layer;
  - a pixel electrode disposed on the white reflective layer and connected to the drain electrode;
- a second substrate disposed substantially opposite to the first substrate;
- a common electrode disposed on the second substrate; and
- an electrooptic layer disposed between the pixel electrode and the common electrode, wherein the drain electrode overlaps with the pixel electrode in the thin film transistor domain and the display domain and includes an upper drain electrode and a lower drain electrode and the upper drain electrode is reflective.

10. The flat panel display of claim 9, wherein the white reflective layer comprises at least one of titanium oxide and barium sulfate.

11. The flat panel display of claim 10, wherein the white reflective layer is about 20 wt % to about 80 wt % titanium oxide.

12. The flat panel display of claim 10, wherein the white reflective layer is about 20 wt % to about 80 wt % barium sulfate.

13. The flat panel display of claim 10, wherein the electrooptic layer comprises:
- a hydrophobic insulating layer disposed on the pixel electrode;
- a barrier rib disposed on the hydrophobic insulating layer and having an opening formed therein; and
- a black oil layer disposed in the opening.

14. The flat panel display of claim 9, wherein the upper drain electrode is made of metal comprising aluminum.

15. The flat panel display of claim 14, wherein the lower drain electrode is made of metal comprising at least one of molybdenum and titanium.

16. The flat panel display of claim 9, further comprising contact holes formed in the passivation layer, the upper drain electrode and the white reflective layer which expose the lower drain electrode,
- wherein the pixel electrode is connected to the lower drain electrode through the contact holes.

17. The flat panel display of claim 9, wherein the passivation layer includes a lower passivation layer and an upper passivation layer,
- the lower passivation layer comprises an inorganic insulating material, and
- the upper passivation layer comprises an organic insulating material.

18. The flat panel display of claim 9, further comprising a color filter disposed between the white reflective layer and the pixel electrode.

19. The flat panel display of claim 18, wherein the color filter comprises a quantum dot.

* * * * *